(12) United States Patent
Yang

(10) Patent No.: US 12,238,429 B2
(45) Date of Patent: Feb. 25, 2025

(54) CONTROL METHOD, CAMERA ASSEMBLY, AND MOBILE TERMINAL

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 17/977,936

(22) Filed: Oct. 31, 2022

(65) Prior Publication Data

US 2023/0046521 A1 Feb. 16, 2023

Related U.S. Application Data

(63) Continuation of application No. PCT/CN2021/088402, filed on Apr. 20, 2021.

(30) Foreign Application Priority Data

May 22, 2020 (CN) .......................... 202010441506.1

(51) Int. Cl.
*H04N 23/84* (2023.01)
*H04M 1/02* (2006.01)
(Continued)

(52) U.S. Cl.
CPC .......... *H04N 23/84* (2023.01); *H04M 1/0264* (2013.01); *H04N 9/64* (2013.01);
(Continued)

(58) Field of Classification Search
CPC .......... H04N 9/64; H04N 23/54; H04N 23/84; H04N 25/133; H04N 25/50; H04N 25/533;
(Continued)

(56) References Cited

U.S. PATENT DOCUMENTS

| 2008/0130073 | A1 | 6/2008 | Compton et al. | |
| 2008/0130991 | A1* | 6/2008 | O'Brien | H04N 23/76 348/E5.041 |

(Continued)

FOREIGN PATENT DOCUMENTS

| CN | 101854488 A | 10/2010 |
| CN | 105027558 A | 11/2015 |

(Continued)

OTHER PUBLICATIONS

Chinese First Office Action with English Translation for CN Application 202010441506.1, mailed Nov. 16, 2021. (34 pages).

(Continued)

*Primary Examiner* — Lin Ye
*Assistant Examiner* — Chriss S Yoder, III
(74) *Attorney, Agent, or Firm* — Young Basile Hanlon & MacFarlane, P.C.

(57) ABSTRACT

A control method, a camera assembly, and a mobile terminal are provided. The control method includes: obtaining original image data by controlling exposure of the 2D pixel array, where the original image data includes color original image data generated by exposure of the color pixels and panchromatic original image data generated by exposure of the panchromatic pixels; and outputting target image data according to the original image data.

20 Claims, 13 Drawing Sheets

(51) Int. Cl.
  *H04N 9/64* (2023.01)
  *H04N 25/50* (2023.01)
  *H04N 25/533* (2023.01)
  *H04N 25/589* (2023.01)
  *H04N 25/75* (2023.01)
  *H04N 25/76* (2023.01)
  *H04N 25/77* (2023.01)

(52) U.S. Cl.
  CPC ........... *H04N 25/50* (2023.01); *H04N 25/533* (2023.01); *H04N 25/589* (2023.01); *H04N 25/75* (2023.01); *H04N 25/76* (2023.01); *H04N 25/77* (2023.01)

(58) Field of Classification Search
  CPC .... H04N 25/534; H04N 25/589; H04N 25/71; H04N 25/75; H04N 25/76; H04N 25/77; H04M 1/0264
  See application file for complete search history.

(56) References Cited

U.S. PATENT DOCUMENTS

| | | | |
|---|---|---|---|
| 2009/0021629 | A1 | 1/2009 | Yamada |
| 2009/0268055 | A1 | 10/2009 | Hamilton, Jr. et al. |
| 2010/0253833 | A1* | 10/2010 | Deever ................ H04N 25/589 348/E5.034 |
| 2013/0214130 | A1 | 8/2013 | Miyahara |
| 2015/0029358 | A1 | 1/2015 | Kaizu |
| 2015/0312461 | A1 | 10/2015 | Kim et al. |
| 2016/0080706 | A1 | 3/2016 | Kaiser et al. |
| 2017/0085806 | A1 | 3/2017 | Richards |
| 2020/0045227 | A1 | 2/2020 | Jiang et al. |
| 2021/0344882 | A1* | 11/2021 | Park .................... H04N 25/616 |

FOREIGN PATENT DOCUMENTS

| | | |
|---|---|---|
| CN | 105516698 A | 4/2016 |
| CN | 105611257 A | 5/2016 |
| CN | 106341617 A | 1/2017 |
| CN | 107040724 A | 8/2017 |
| CN | 105516697 B | 4/2018 |
| CN | 109474771 A | 3/2019 |
| CN | 110649056 A | 1/2020 |
| CN | 110740272 A | 1/2020 |
| CN | 110913152 A | 3/2020 |
| CN | 110971799 A | 4/2020 |
| CN | 110996077 A | 4/2020 |
| CN | 111050041 A | 4/2020 |
| CN | 110447230 B | 12/2021 |
| EP | 2092757 A2 | 8/2009 |

OTHER PUBLICATIONS

Chinese Notification to Grant Patent Right for Invention with English Translation for CN Application 202010441506.1, mailed Jan. 29, 2022. (6 pages).

International Search Report and Written Opinion with English Translation for PCT Application PCT/CN2021/088402 mailed Jul. 14, 2021. (18 pages).

Extended European Search Report for EP Application 21808075.2 mailed Jul. 14, 2023. (08 pages).

Chinese First Office Action with English translation issued in corresponding CN application No. 202111355951.7 dated Feb. 3, 2024, 25 pages.

European Examination report issued in corresponding European Application No. 21808075.2, dated Dec. 9, 2024, 7 pages.

* cited by examiner

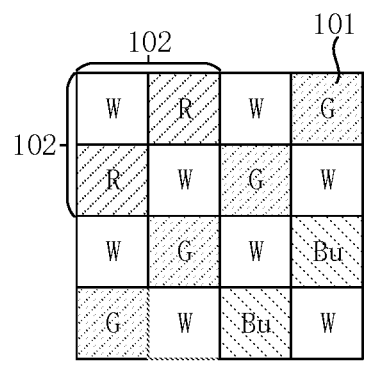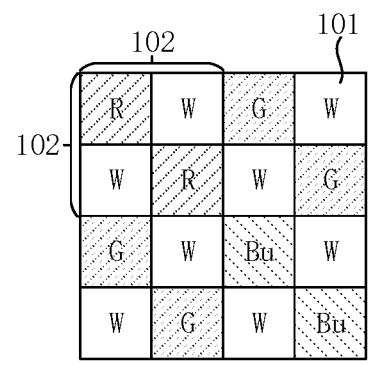
FIG. 6   FIG. 7
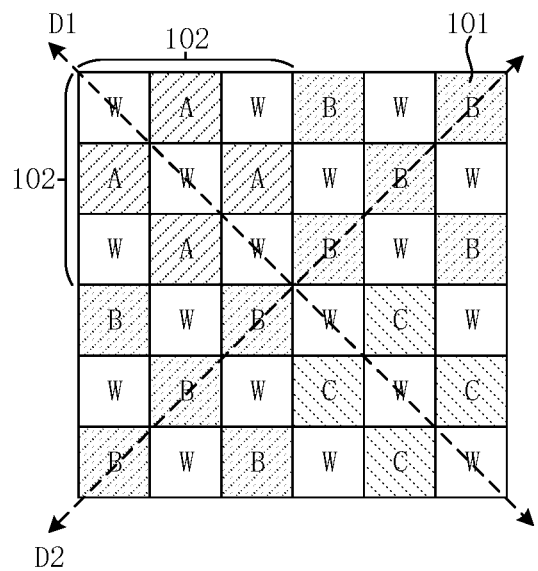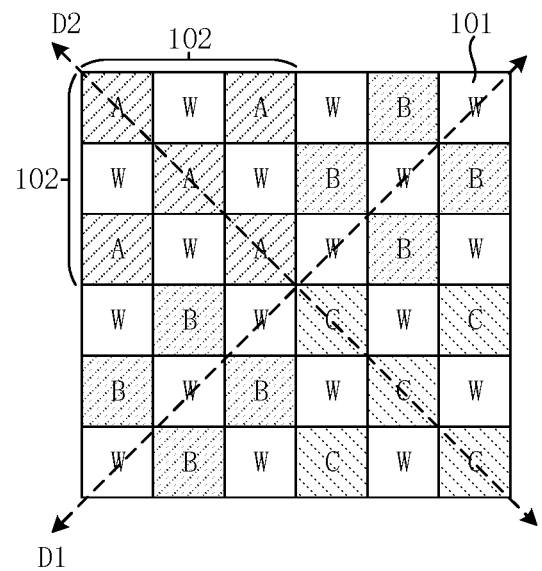
FIG. 8   FIG. 9

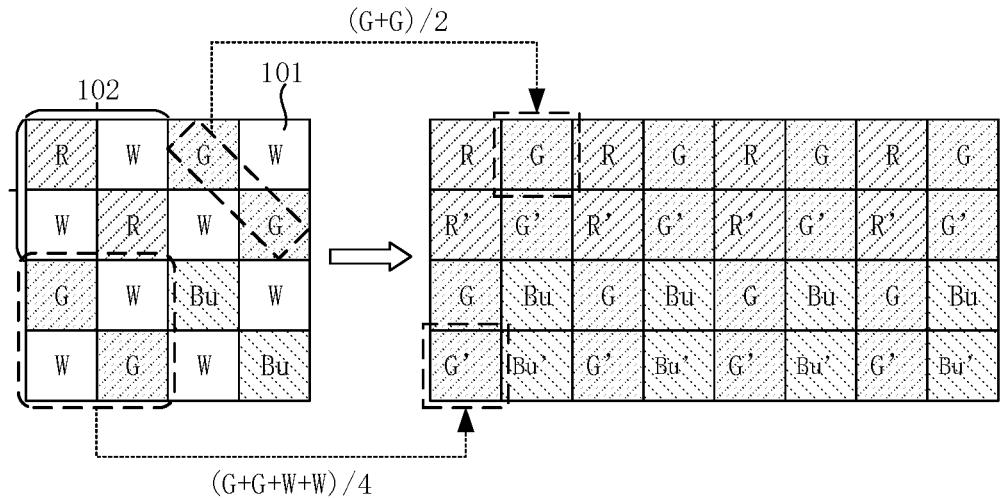

FIG. 25

0226 Obtain first target image data by performing pixel addition on the color original image data generated by exposure of the multiple color pixels in each subunit 0227 Obtain second target image data by performing pixel addition on the color original image data generated by exposure of the multiple color pixels in each subunit and the panchromatic original image data generated by exposure of the multiple panchromatic pixels in each subunit

FIG. 26

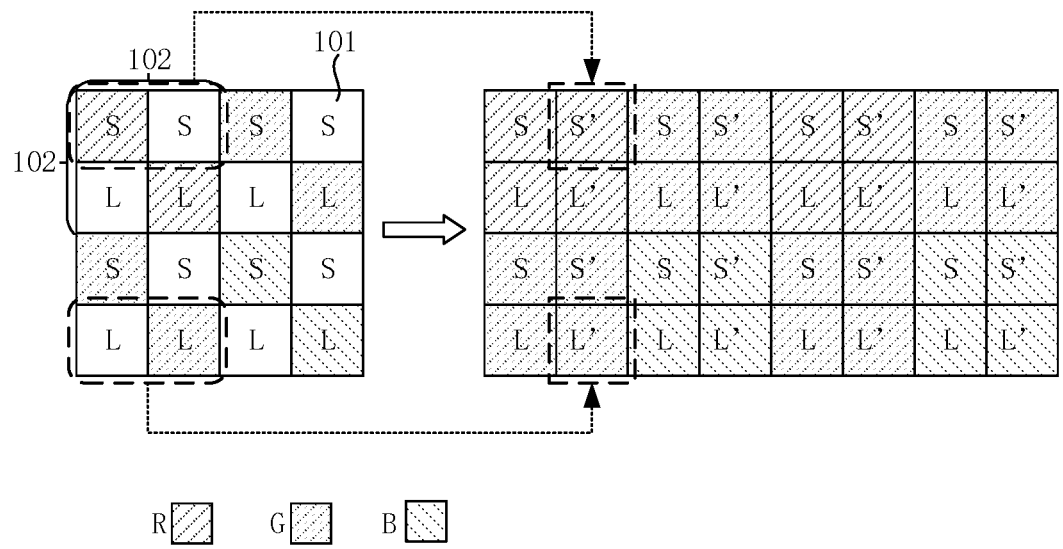

FIG. 29

| Obtain the third target image data by performing pixel addition on the first color original image data generated by exposure of the color pixels in each subunit for the first exposure duration and the first panchromatic original image data generated by exposure of the panchromatic pixels in each subunit for the first exposure duration | 0231 |

↓

| Obtain the fourth target image data is obtained by performing pixel addition on the second color original image data generated by exposure of the color pixels in each subunit for the second exposure duration and the second panchromatic original image data generated by exposure of the panchromatic pixels in each subunit for the second exposure duration | 0232 |

FIG. 30

CONTROL METHOD, CAMERA ASSEMBLY, AND MOBILE TERMINAL

CROSS-REFERENCE TO RELATED APPLICATION(S)

This application is a continuation of International Application No. PCT/CN2021/088402, filed Apr. 20, 2021, which claims priority to and the benefit of Chinese Patent Application No. 202010441506.1, filed May 22, 2020, the entire disclosures of both of which are hereby incorporated by reference.

TECHNICAL FIELD

This disclosure relates to the field of imaging, and more specifically, to a control method, a camera assembly, and a mobile terminal.

BACKGROUND

With the development of electronic technology, terminals with camera functions have been popularized in daily life. At present, types of data outputted by mobile phones are mainly based on an image sensor with Bayer pixel arrangement or an image sensor with QuadBayer pixel arrangement. For image sensors with other pixel arrangements, the data output needs to be improved.

SUMMARY

In a first aspect, a control method for an image sensor is provided. The image sensor includes a two-dimensional (2D) pixel array. The 2D pixel array includes multiple minimal repeating units, where each minimal repeating unit includes multiple subunits. Each subunit includes multiple color pixels and multiple panchromatic pixels. The color pixels have a narrower spectral response than the panchromatic pixels. The control method includes the following. Original image data is obtained by controlling exposure of the 2D pixel array, where the original image data includes color original image data generated by exposure of the color pixels and panchromatic original image data generated by exposure of the panchromatic pixels. Target image data is outputted according to the original image data.

In a second aspect, a camera assembly is provided. The camera assembly includes an image sensor and a processor. The image sensor includes a 2D pixel array. The 2D pixel array includes multiple minimal repeating units, where each minimal repeating unit includes multiple subunits. Each subunit includes multiple color pixels and multiple panchromatic pixels. The color pixels have a narrower spectral response than the panchromatic pixels. The processor is configured to obtain original image data by controlling exposure of the 2D pixel array, and to output target image data according to the original image data, where the original image data includes color original image data generated by exposure of the color pixels and panchromatic original image data generated by exposure of the panchromatic pixels.

In a third aspect, a mobile terminal is provided. The mobile terminal includes a housing and a camera assembly received in the housing. The camera assembly includes an image sensor and a processor. The image sensor includes a 2D pixel array. The 2D pixel array includes multiple minimal repeating units, where each minimal repeating unit includes multiple subunits. Each subunit includes multiple color pixels and multiple panchromatic pixels. The color pixels have a narrower spectral response than the panchromatic pixels. The processor is configured to obtain original image data by controlling exposure of the 2D pixel array, and to output target image data according to the original image data, where the original image data includes color original image data generated by exposure of the color pixels and panchromatic original image data generated by exposure of the panchromatic pixels.

BRIEF DESCRIPTION OF DRAWINGS

The above and/or additional aspects and advantages of the disclosure will become apparent and readily understood from the following description of implementations taken in conjunction with the accompanying drawings, in which:

FIG. 4 to FIG. 15 are schematic diagrams each illustrating an arrangement of pixels in a minimal repeating unit in some implementations of the disclosure.

FIG. 25 is a schematic diagram illustrating a principle of a control method in some implementations of the disclosure.

FIG. 26 is a schematic flowchart of a control method in some implementations of the disclosure.

FIG. 29 is a schematic diagram illustrating a principle of a control method in some implementations of the disclosure.

FIG. 30 is a schematic flowchart of a control method in some implementations of the disclosure.

DETAILED DESCRIPTION

Figure 1:
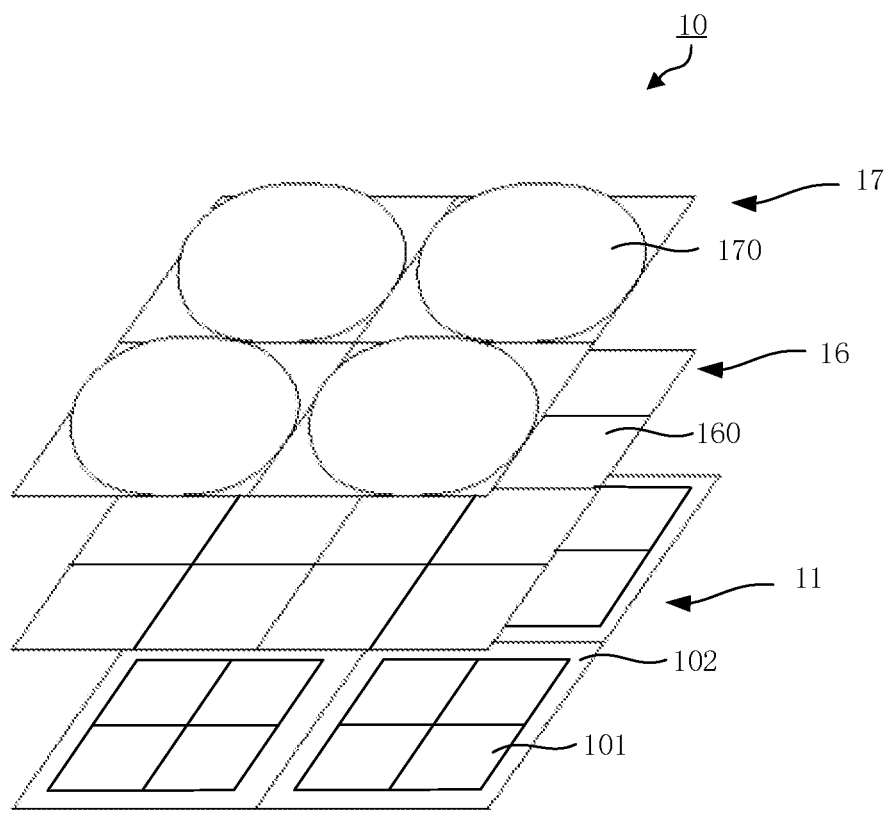
FIG. 1 is a schematic diagram of an image sensor in some implementations of the disclosure.

Implementations of the disclosure are described in detail below, examples of which are illustrated in the accompanying drawings, where the same or similar reference numerals refer to the same or similar elements or elements having the same or similar functions throughout. The implementations described below with reference to the accompanying drawings are exemplary, only used to explain the disclosure, and should not be construed as a limitation on the disclosure.

With the development of electronic technology, terminals with camera functions have been popularized in daily life. At present, types of data outputted by mobile phones is mainly based on an image sensor with Bayer pixel arrangement or an image sensor with QuadBayer pixel arrangement. For image sensors with other pixel arrangements, the data output needs to be improved.

For the above reasons, referring to FIG. 1, FIG. 16, FIG. 17, and FIG. 31, implementations of the disclosure provide a control method, a camera assembly 40, and a mobile terminal 90.

Figure 16:
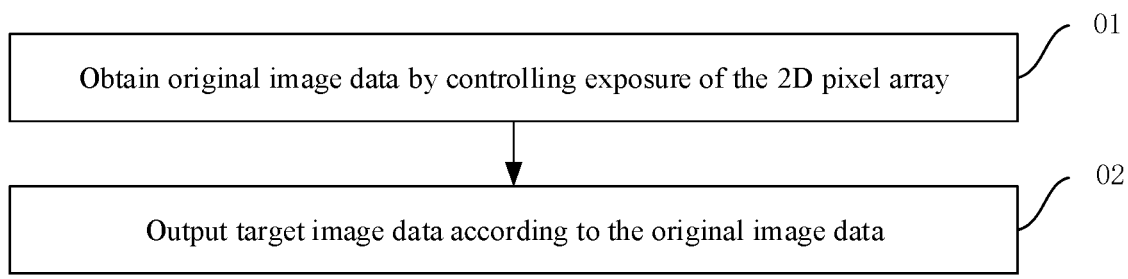
FIG. 16 is a schematic flowchart of a control method in some implementations of the disclosure.

Referring to FIG. 1 and FIG. 16, the control method in implementations of the disclosure is applied to an image sensor 10. The image sensor 10 includes a two-dimensional (2D) pixel array 11. The 2D pixel array 11 includes multiple color pixels and multiple panchromatic pixels. The color pixels have a narrower spectral response than the panchromatic pixels. The 2D pixel array 11 includes minimal repeating units, where each minimal repeating unit includes multiple subunits 102. Each subunit 102 includes multiple color pixels and multiple panchromatic pixels. The control method includes operations 01 and 02.
- 01: Original image data is obtained by controlling exposure of the 2D pixel array 11, where the original image data includes color original image data generated by exposure of the color pixels and panchromatic original image data generated by exposure of the panchromatic pixels.
- 02: Target image data is outputted according to the original image data.

Figure 17:
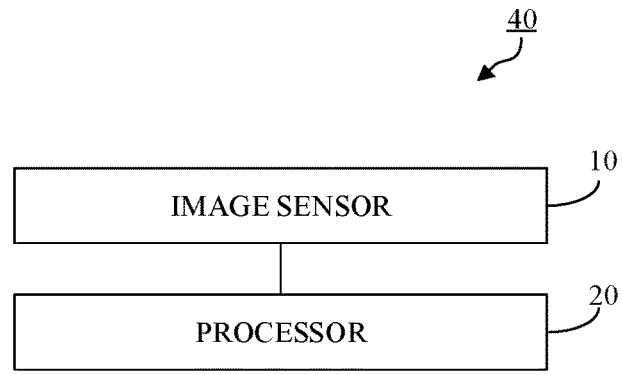
FIG. 17 is a schematic diagram of a camera assembly in some implementations of the disclosure.
Figure 18:
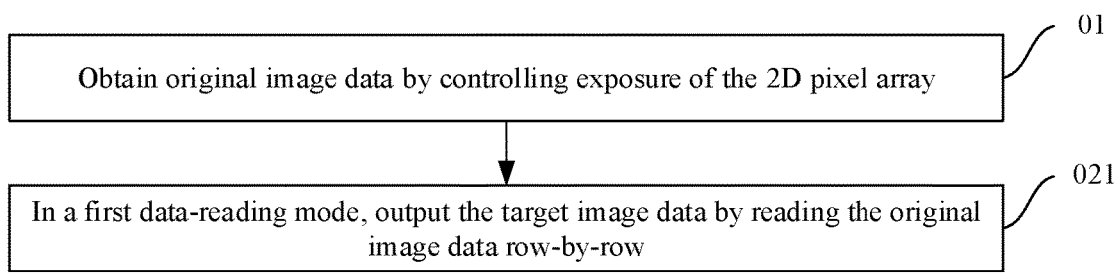
FIG. 18 is a schematic flowchart of a control method in some implementations of the disclosure.

Referring to FIG. 17 and FIG. 18, in some implementations, the target image data is outputted according to the original image data (i.e., operation 02) as follow.
- 021: In a first data-reading mode, the target image data is outputted by reading the original image data row-by-row.

Figure 21:
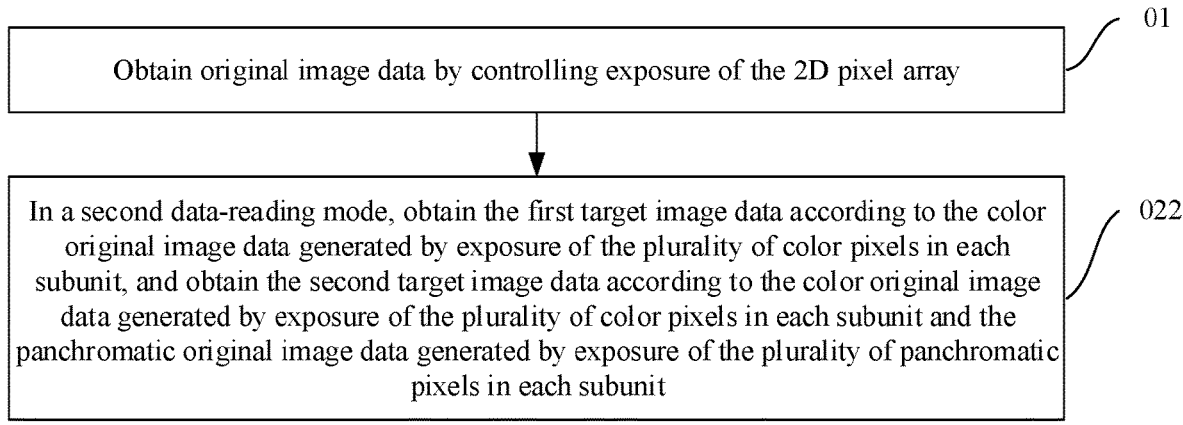
FIG. 21 is a schematic flowchart of a control method in some implementations of the disclosure.

Referring to FIG. 17 and FIG. 21, in some implementations, the target image data includes first target image data and second target image data. The target image data is outputted according to the original image data (i.e., operation 02) as follow.
- 022: In a second data-reading mode, the first target image data is obtained according to the color original image data generated by exposure of the multiple color pixels in each subunit 102, and the second target image data is obtained according to the color original image data generated by exposure of the multiple color pixels in each subunit 102 and the panchromatic original image data generated by exposure of the multiple panchromatic pixels in each subunit 102.

Figure 23:
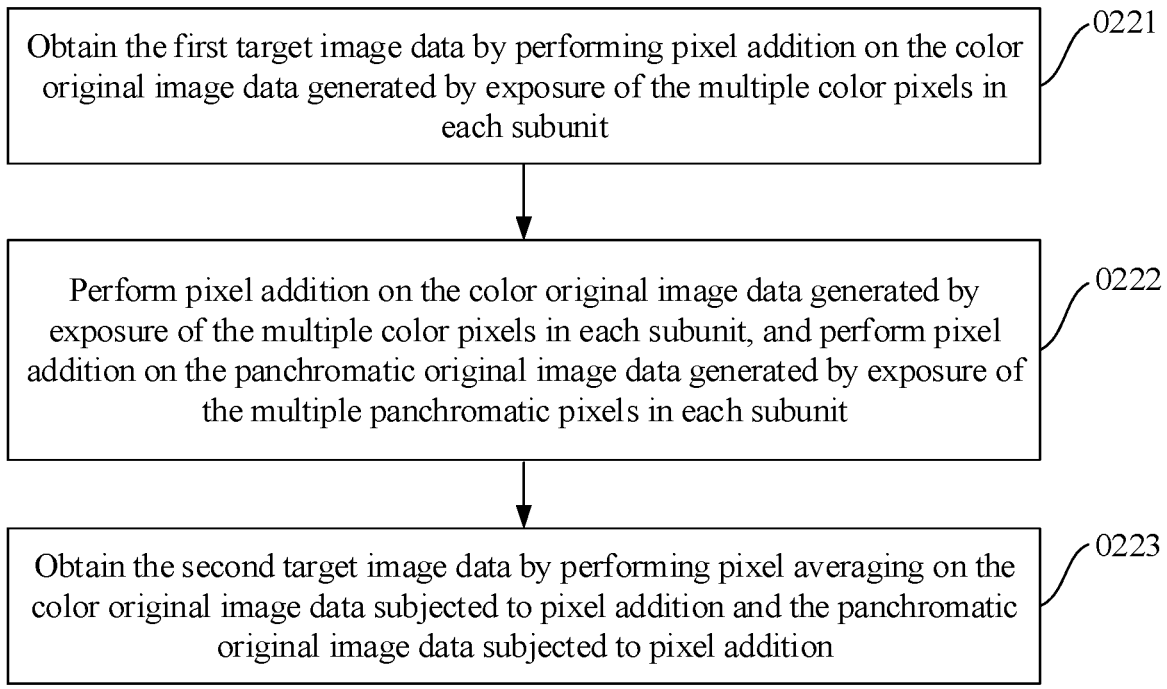
FIG. 23 and FIG. 24 are schematic flowcharts of control methods in some implementations of the disclosure.

Referring to FIG. 17 and FIG. 23, in some implementations, the first target image data is obtained according to the color original image data generated by exposure of the multiple color pixels in each subunit 102 as follows.
- 0221: The first target image data is obtained by performing pixel addition on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.
- 0222: Pixel addition is performed on the color original image data generated by exposure of the multiple color pixels in each subunit 102, and pixel addition is performed on the panchromatic original image data generated by exposure of the multiple panchromatic pixels in each subunit 102.
- 0223: The second target image data is obtained by performing pixel averaging on the color original image data subjected to pixel addition and the panchromatic original image data subjected to pixel addition.

Figure 24:
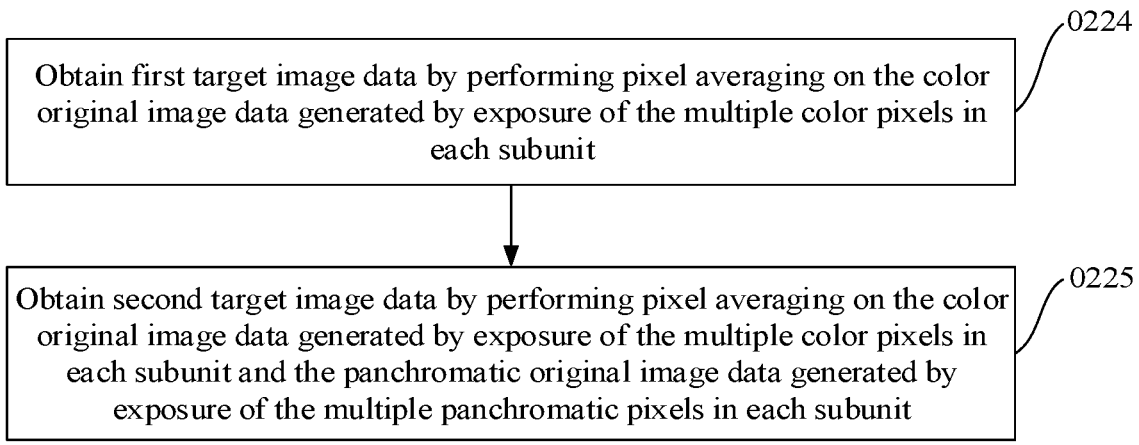

Referring to FIG. 17 and FIG. 24, in some implementations, the first target image data is obtained according to the color original image data generated by exposure of the multiple color pixels in each subunit 102 as follows.
- 0224: The first target image data is obtained by performing pixel averaging on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.
- 0225: The second target image data is obtained by performing pixel averaging on the color original image data generated by exposure of the multiple color pixels in each subunit 102 and the panchromatic original image data generated by exposure of the multiple panchromatic pixels in each subunit 102.

Referring to FIG. 17 and FIG. 26, in some implementations, the first target image data is obtained according to the color original image data generated by exposure of the multiple color pixels in each subunit 102 as follows.
- 0226: The first target image data is obtained by performing pixel addition on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.
- 0227: The second target image data is obtained by performing pixel addition on the color original image data generated by exposure of the multiple color pixels in each subunit 102 and the panchromatic original image data generated by exposure of the multiple panchromatic pixels in each subunit 102.

Figure 28:
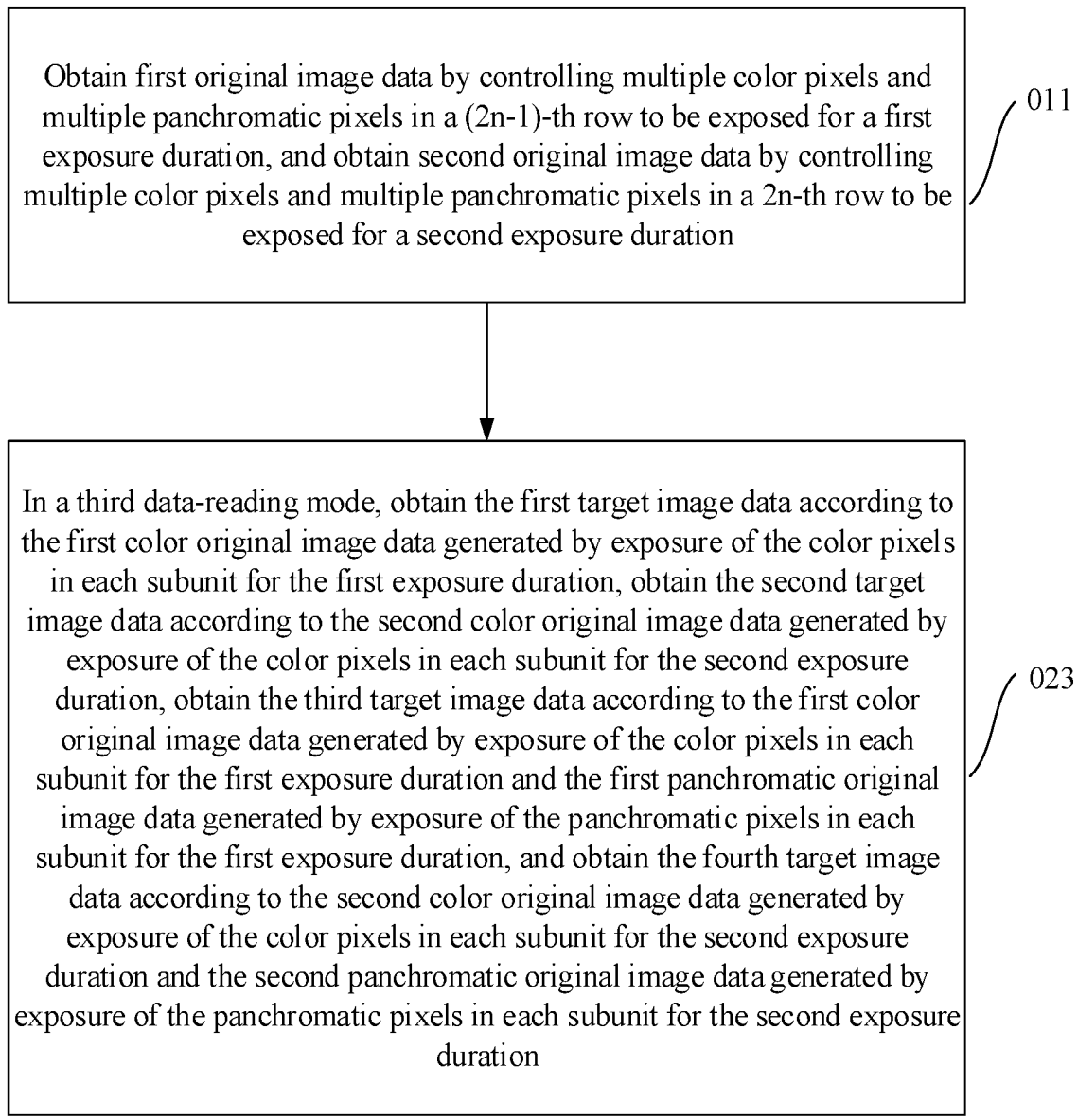
FIG. 28 is a schematic flowchart of a control method in some implementations of the disclosure.

Referring to FIG. 17 and FIG. 28, in some implementations, the original image data is obtained by controlling exposure of the 2D pixel array (i.e., operation 01) as follows.
- 011: First original image data is obtained by controlling multiple color pixels and multiple panchromatic pixels in a (2n−1)-th row to be exposed for a first exposure duration, and second original image data is obtained by controlling multiple color pixels and multiple panchromatic pixels in a 2n-th row to be exposed for a second exposure duration, where n is a natural number greater than or equal to 1, the first exposure duration is different from the second exposure duration, the first original image data includes first color original image data generated by exposure of the color pixels and first panchromatic original image data generated by exposure of the panchromatic pixels, and the second original image data includes second color original image data generated by exposure of the color pixels and second panchromatic original image data generated by exposure of the panchromatic pixels.

The target image data includes first target image data, second target image data, third target image data, and fourth target image data. The target image data is outputted according to the original image data (i.e., operation 02) as follows.

023: In a third data-reading mode, the first target image data is obtained according to the first color original image data generated by exposure of the color pixels in each subunit 102 for the first exposure duration, the second target image data is obtained according to the second color original image data generated by exposure of the color pixels in each subunit 102 for the second exposure duration, the third target image data is obtained according to the first color original image data generated by exposure of the color pixels in each subunit 102 for the first exposure duration and the first panchromatic original image data generated by exposure of the panchromatic pixels in each subunit 102 for the first exposure duration, and the fourth target image data is obtained according to the second color original image data generated by exposure of the color pixels in each subunit 102 for the second exposure duration and the second panchromatic original image data generated by exposure of the panchromatic pixels in each subunit 102 for the second exposure duration.

Referring to FIG. 17 and FIG. 30, in some implementations, the third target image data is obtained according to the first color original image data generated by exposure of the color pixels in each subunit 102 for the first exposure duration and the first panchromatic original image data generated by exposure of the panchromatic pixels in each subunit 102 for the first exposure duration as follows.

0231: The third target image data is obtained by performing pixel addition on the first color original image data generated by exposure of the color pixels in each subunit 102 for the first exposure duration and the first panchromatic original image data generated by exposure of the panchromatic pixels in each subunit 102 for the first exposure duration.

The fourth target image data is obtained according to the second color original image data generated by exposure of the color pixels in each subunit 102 for the second exposure duration and the second panchromatic original image data generated by exposure of the panchromatic pixels in each subunit 102 for the second exposure duration as follows.

0232: The fourth target image data is obtained by performing pixel addition on the second color original image data generated by exposure of the color pixels in each subunit 102 for the second exposure duration and the second panchromatic original image data generated by exposure of the panchromatic pixels in each subunit 102 for the second exposure duration.

Referring to FIG. 1 and FIG. 17, the camera assembly 40 in implementations of the disclosure includes an image sensor 10 and a processor 20. The image sensor 10 includes a two-dimensional (2D) pixel array 11. The 2D pixel array 11 includes multiple color pixels and multiple panchromatic pixels. The color pixels have a narrower spectral response than the panchromatic pixels. The 2D pixel array 11 includes minimal repeating units, where each minimal repeating unit includes multiple subunits 102. Each subunit 102 includes multiple color pixels and multiple panchromatic pixels. The processor 20 is configured to obtain original image data by controlling exposure of the 2D pixel array 11, and to output target image data according to the original image data, where the original image data includes color original image data generated by exposure of the color pixels and panchromatic original image data generated by exposure of the panchromatic pixels.

In some implementations, the processor 20 may be configured to, in a first data-reading mode, output the target image data by reading the original image data row-by-row.

In some implementations, the processor 20 may be configured to, in a second data-reading mode, obtain the first target image data according to the color original image data generated by exposure of the multiple color pixels in each subunit 102, and obtain the second target image data according to the color original image data generated by exposure of the multiple color pixels in each subunit 102 and the panchromatic original image data generated by exposure of the multiple panchromatic pixels in each subunit 102.

In some implementations, the processor 20 may be configured to obtain the first target image data by performing pixel addition on the color original image data generated by exposure of the multiple color pixels in each subunit 102, perform pixel addition on the color original image data generated by exposure of the multiple color pixels in each subunit 102, perform pixel addition on the panchromatic original image data generated by exposure of the multiple panchromatic pixels in each subunit 102, and obtain the second target image data by performing pixel averaging on the color original image data subjected to pixel addition and the panchromatic original image data subjected to pixel addition.

In some implementations, the processor 20 may be configured to obtain the first target image data by performing pixel averaging on the color original image data generated by exposure of the multiple color pixels in each subunit 102, and obtain the second target image data by performing pixel averaging on the color original image data generated by exposure of the multiple color pixels in each subunit 102 and the panchromatic original image data generated by exposure of the multiple panchromatic pixels in each subunit 102.

In some implementations, the processor 20 may be configured to obtain the first target image data by performing pixel addition on the color original image data generated by exposure of the multiple color pixels in each subunit 102, and obtain the second target image data by performing pixel addition on the color original image data generated by exposure of the multiple color pixels in each subunit 102 and the panchromatic original image data generated by exposure of the multiple panchromatic pixels in each subunit 102.

In some implementations, the processor 20 may be configured to obtain first original image data by controlling multiple color pixels and multiple panchromatic pixels in a (2n−1)-th row to be exposed for a first exposure duration, and obtain second original image data by controlling multiple color pixels and multiple panchromatic pixels in a 2n-th row to be exposed for a second exposure duration, where n is a natural number greater than or equal to 1. The first exposure duration is different from the second exposure duration, the first original image data includes first color original image data generated by exposure of the color pixels and first panchromatic original image data generated by exposure of the panchromatic pixels, and the second original image data includes second color original image data generated by exposure of the color pixels and second panchromatic original image data generated by exposure of the panchromatic pixels. The target image data includes first target image data, second target image data, third target image data, and fourth target image data. The processor may be further configured to, in a third data-reading mode, obtain the first target image data according to the first color original image data generated by exposure of the color pixels in each subunit 102 for the first exposure duration, obtain the second target image data according to the second color original image data generated by exposure of the color pixels in each subunit 102 for the second exposure duration, obtain the third target image data according to the first color original image data generated by exposure of the color pixels in each subunit 102 for the first exposure duration and the first panchromatic original image data generated by exposure of the panchromatic pixels in each subunit 102 for the first exposure duration, and obtain the fourth target image data according to the second color original image data generated by exposure of the color pixels in each subunit 102 for the second exposure duration and the second panchromatic original image data generated by exposure of the panchromatic pixels in each subunit 102 for the second exposure duration.

In some implementations, the processor 20 may be configured to obtain the third target image data by performing pixel addition on the first color original image data generated by exposure of the color pixels in each subunit 102 for the first exposure duration and the first panchromatic original image data generated by exposure of the panchromatic pixels in each subunit 102 for the first exposure duration, and obtain the fourth target image data by performing pixel addition on the second color original image data generated by exposure of the color pixels in each subunit 102 for the second exposure duration and the second panchromatic original image data generated by exposure of the panchromatic pixels in each subunit 102 for the second exposure duration.

Figure 31:
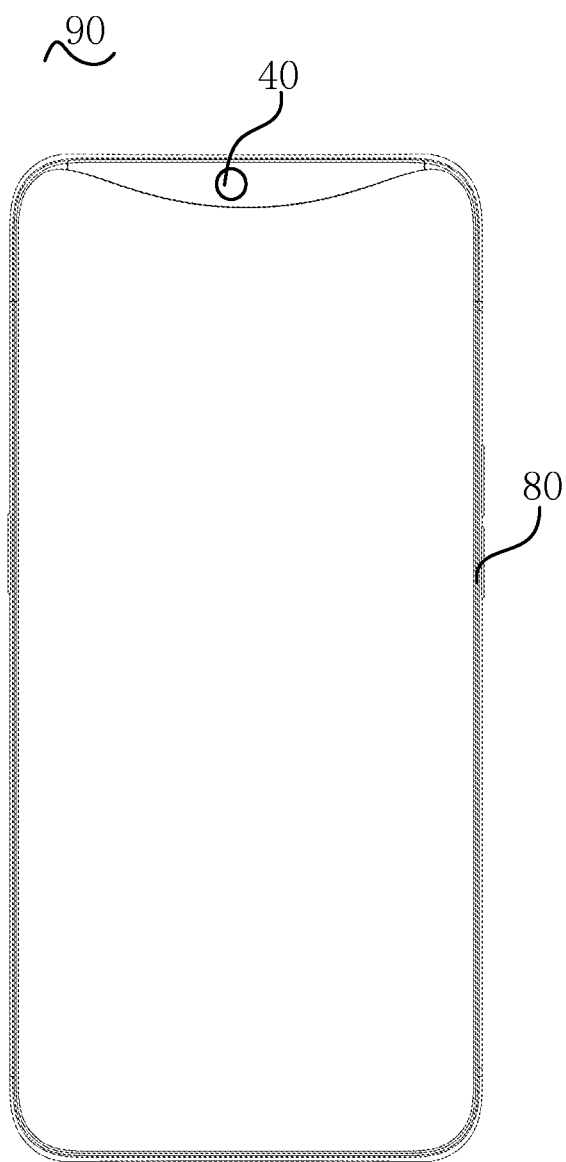
FIG. 31 is a schematic diagram of a mobile terminal in some implementations of the disclosure.

Referring to FIG. 1, FIG. 17, and FIG. 31, the mobile terminal 90 according to implementations of the disclosure includes a housing 80 and a camera assembly 40 installed in the housing 80. The camera assembly 40 includes an image sensor 10 and a processor 20. The image sensor 10 includes a two-dimensional (2D) pixel array 11. The 2D pixel array 11 includes multiple color pixels and multiple panchromatic pixels. The color pixels have a narrower spectral response than the panchromatic pixels. The 2D pixel array 11 includes minimal repeating units, where each minimal repeating unit includes multiple subunits 102. Each subunit 102 includes multiple color pixels and multiple panchromatic pixels. The processor 20 is configured to obtain original image data by controlling exposure of the 2D pixel array 11, and to output target image data according to the original image data, where the original image data includes color original image data generated by exposure of the color pixels and panchromatic original image data generated by exposure of the panchromatic pixels.

In some implementations, the processor 20 may be configured to, in a first data-reading mode, output the target image data by reading the original image data row-by-row.

In some implementations, the processor 20 may be configured to, in a second data-reading mode, obtain the first target image data according to the color original image data generated by exposure of the multiple color pixels in each subunit 102, and obtain the second target image data according to the color original image data generated by exposure of the multiple color pixels in each subunit 102 and the panchromatic original image data generated by exposure of the multiple panchromatic pixels in each subunit 102.

In some implementations, the processor 20 may be configured to obtain the first target image data by performing pixel addition on the color original image data generated by exposure of the multiple color pixels in each subunit 102, perform pixel addition on the color original image data generated by exposure of the multiple color pixels in each subunit 102, perform pixel addition on the panchromatic original image data generated by exposure of the multiple panchromatic pixels in each subunit 102, and obtain the second target image data by performing pixel averaging on the color original image data subjected to pixel addition and the panchromatic original image data subjected to pixel addition.

In some implementations, the processor 20 may be configured to obtain the first target image data by performing pixel averaging on the color original image data generated by exposure of the multiple color pixels in each subunit 102, and obtain the second target image data by performing pixel averaging on the color original image data generated by exposure of the multiple color pixels in each subunit 102 and the panchromatic original image data generated by exposure of the multiple panchromatic pixels in each subunit 102.

In some implementations, the processor 20 may be configured to obtain the first target image data by performing pixel addition on the color original image data generated by exposure of the multiple color pixels in each subunit 102, and obtain the second target image data by performing pixel addition on the color original image data generated by exposure of the multiple color pixels in each subunit 102 and the panchromatic original image data generated by exposure of the multiple panchromatic pixels in each subunit 102.

In some implementations, the processor 20 may be configured to obtain first original image data by controlling multiple color pixels and multiple panchromatic pixels in a (2n−1)-th row to be exposed for a first exposure duration, and obtain second original image data by controlling multiple color pixels and multiple panchromatic pixels in a 2n-th row to be exposed for a second exposure duration, where n is a natural number greater than or equal to 1, the first exposure duration is different from the second exposure duration, the first original image data includes first color original image data generated by exposure of the color pixels and first panchromatic original image data generated by exposure of the panchromatic pixels, and the second original image data includes second color original image data generated by exposure of the color pixels and second panchromatic original image data generated by exposure of the panchromatic pixels. The target image data includes first target image data, second target image data, third target image data, and fourth target image data. The processor may be further configured to, in a third data-reading mode, obtain the first target image data according to the first color original image data generated by exposure of the color pixels in each subunit 102 for the first exposure duration, obtain the second target image data according to the second color original image data generated by exposure of the color pixels in each subunit 102 for the second exposure duration, obtain the third target image data according to the first color original image data generated by exposure of the color pixels in each subunit 102 for the first exposure duration and the first panchromatic original image data generated by exposure of the panchromatic pixels in each subunit 102 for the first exposure duration, and obtain the fourth target image data according to the second color original image data generated by exposure of the color pixels in each subunit 102 for the second exposure duration and the second panchromatic original image data generated by exposure of the panchromatic pixels in each subunit 102 for the second exposure duration.

In some implementations, the processor 20 is configured to obtain the third target image data by performing pixel addition on the first color original image data generated by exposure of the color pixels in each subunit 102 for the first exposure duration and the first panchromatic original image data generated by exposure of the panchromatic pixels in each subunit 102 for the first exposure duration, and obtain the fourth target image data by performing pixel addition on the second color original image data generated by exposure of the color pixels in each subunit 102 for the second exposure duration and the second panchromatic original image data generated by exposure of the panchromatic pixels in each subunit 102 for the second exposure duration.

According to the control method, the camera assembly 40, and the mobile terminal 90 in implementations of the disclosure, multiple panchromatic pixels are added in the 2D pixel array 11. Compared with the general image sensor based on Bayer pixel arrangement or based on QuadBayer pixel arrangement, luminous flux can be increased, allowing a better signal to noise ratio (SNR). According to the control method, the camera assembly 40, and the mobile terminal 90 in the implementations of the disclosure, exposure of the 2D pixel array is controlled to obtain the original image data, and the target image data is outputted according to the original image data, so that a data output structure of the output target image data can be matched with back-end algorithms and hardware functions.

In the following, a basic structure of the image sensor 10 will be introduced. Referring to FIG. 1, FIG. 1 is a schematic diagram of the image sensor 10 in implementations of the disclosure. The image sensor 10 includes a 2D pixel array 11, a filter array 16, and a lens array 17. Along a light-receiving direction of the image sensor 10, the lens array 17, the filter array 16, and the 2D pixel array 11 are arranged in sequence.

The image sensor 10 may use a complementary metal oxide semiconductor (CMOS) photosensitive element or a charge-coupled device (CCD) photosensitive element.

The 2D pixel array 11 includes multiple pixels 101 arranged in a 2D array. The 2D pixel array 11 includes minimal repeating units, and each minimal repeating unit includes multiple subunits 102.

The filter array 16 includes multiple filters 160, and each filter 160 covers a corresponding pixel 101. The spectral response of each pixel 101 (i.e., the color of light that the pixel 101 can receive) is determined by the color of the filter 160 corresponding to that pixel 101.

The lens array 17 includes multiple lenses 170, and each lens 170 covers a corresponding subunit 102 (as illustrated in FIG. 1). Optionally, each lens 170 may cover a corresponding pixel 101.

Figure 2:
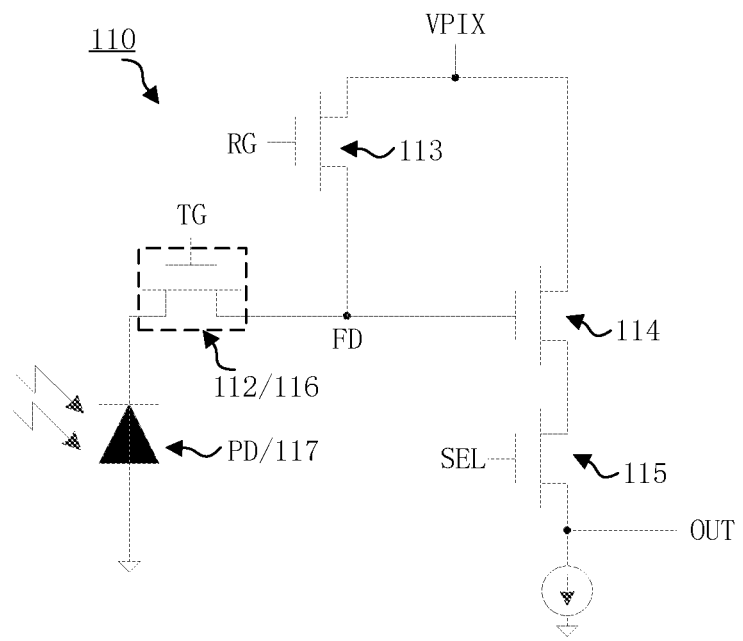
FIG. 2 is a schematic diagram of a pixel circuit in some implementations of the disclosure.

FIG. 2 is a schematic diagram of a pixel circuit 110 in implementations of the disclosure. The operation principle of the pixel circuit 110 is described below in conjunction with FIG. 1 and FIG. 2.

As illustrated in FIG. 1 and FIG. 2, the pixel circuit 110 includes a photoelectric conversion element 117 (for example, a photodiode PD), an exposure control circuit 116 (for example, a transfer transistor 112), a reset circuit (for example, a reset transistor 113), an amplifying circuit (for example, an amplifying transistor 114), and a selecting circuit (for example, a selecting transistor 115). In implementations of the disclosure, the transfer transistor 112, the reset transistor 113, the amplifying transistor 114, and the selecting transistor 115 are each, for example, a MOS transistor, but are not limited thereto.

For example, referring to FIG. 1 and FIG. 2, the gate TG of the transfer transistor 112 is connected to a vertical drive unit (not illustrated) of the image sensor 10 through the exposure control line (not illustrated). The gate RG of the reset transistor 113 is connected to the vertical drive unit through a reset control line (not illustrated). The gate SEL of the selecting transistor 115 is connected to the vertical drive unit through a selecting line (not illustrated). The exposure control circuit 116 (such as transfer transistor 112) in each pixel circuit 110 is electrically connected with the photoelectric conversion element 117 and is configured to transfer a potential accumulated by the photoelectric conversion element 117 after illumination. For example, the photoelectric conversion element 117 includes the photodiode PD, and the anode of the photodiode PD is connected to ground, for example. The photodiode PD converts the received light into charges. The cathode of the photodiode PD is connected to a floating diffusion unit FD through the exposure control circuit 116 (for example, the transfer transistor 112). The floating diffusion unit FD is connected to the gate of the amplifying transistor 114 and the source of the reset transistor 113.

For example, the exposure control circuit 116 is the transfer transistor 112, and the control terminal TG of the exposure control circuit 116 is the gate of the transfer transistor 112. When a pulse of an effective level (for example, VPIX level) is transmitted to the gate of the transfer transistor 112 through the exposure control line, the transfer transistor 112 is turned on. The transfer transistor 112 transmits the charges generated from photoelectric conversion by the photodiode PD to the floating diffusion unit FD.

For example, the drain of the reset transistor 113 is connected to a pixel power supply VPIX. The source of the reset transistor 113 is connected to the floating diffusion unit FD. Before the charges are transferred from the photodiode PD to the floating diffusion unit FD, a pulse of an effective reset level is transmitted to the gate of the reset transistor 113 through the reset line, and the reset transistor 113 is turned on. The reset transistor 113 resets the floating diffusion unit FD to the pixel power supply VPIX.

For example, the gate of the amplifying transistor 114 is connected to the floating diffusion unit FD. The drain of the amplifying transistor 114 is connected to the pixel power supply VPIX. After the floating diffusion unit FD is reset by the reset transistor 113, the amplifying transistor 114 outputs a reset level through an output terminal OUT via the selecting transistor 115. After the charges of the photodiode PD are transferred by the transfer transistor 112, the amplifying transistor 114 outputs a signal level through the output terminal OUT via the selecting transistor 115.

For example, the drain of the selecting transistor 115 is connected to the source of the amplifying transistor 114. The source of selecting transistor 115 is connected to a column processing unit (not illustrated) of the image sensor 10 through the output terminal OUT. When a pulse of an effective level is transmitted to the gate of selecting transistor 115 through the selecting line, the selecting transistor 115 is turned on. The signal outputted from the amplifying transistor 114 is transmitted to the column processing unit through the selecting transistor 115.

It should be noted that the pixel structure of the pixel circuit 110 in the implementations of the disclosure is not limited to the structure illustrated in FIG. 2. For example, the pixel circuit 110 may have a three-transistor pixel structure, in which the functions of the amplifying transistor 114 and the selecting transistor 115 are realized by a single transistor. For example, the exposure control circuit 116 is also not limited to one transfer transistor 112, and other electronic elements or structures with control terminals to control the conduction function can be used as the exposure control circuit in the implementations of the disclosure. The implementation of a single transfer transistor 112 is simple, low cost, and easy to control.

In an image sensor including multiple types of color pixels, pixels of different colors receive different exposure amounts per unit time. While some colors are saturated, other colors have not yet been exposed to an ideal state. For example, exposure to 60%-90% of a saturated exposure amount may have a relatively good SNR and accuracy, but the implementations of the disclosure are not limited thereto.

Figure 3:
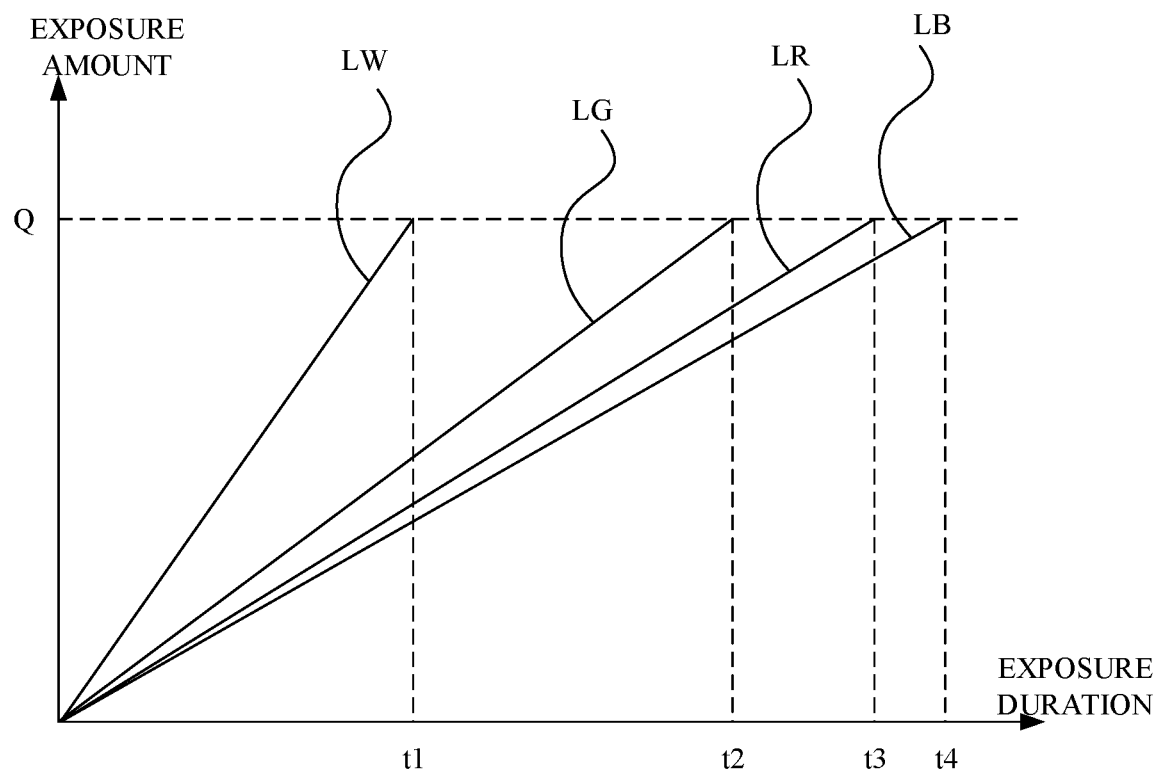
FIG. 3 is a schematic diagram of exposure saturation time of different color channels.

FIG. 3 illustrates RGBW (red, green, blue, panchromatic) as an example. Referring to FIG. 3, the horizontal axis represents an exposure duration, the vertical axis represents an exposure amount, Q represents a saturated exposure amount, LW represents an exposure curve of the panchromatic pixel W, LG represents an exposure curve of the green pixel G, LR represents an exposure curve of the red pixel R, and LB represents an exposure curve of the blue pixel.

As can be seen from FIG. 3, the slope of the exposure curve LW of the panchromatic pixel W is the steepest, which means that the panchromatic pixel W can obtain more exposure per unit time and reaches saturation at time t1. The slope of the exposure curve LG of the green pixel G is the second steepest, and the green pixel G reaches saturation at time t2. The slope of the exposure curve LR of the red pixel R is the third steepest, and the red pixel R reaches saturation at time t3. The slope of the exposure curve LB of the blue pixel B is the least steep, and the blue pixel B reaches saturation at time t4. As can be seen from FIG. 3, the exposure amount received by the panchromatic pixel W per unit time is greater than the exposure amount received by the color pixel per unit time, that is, the sensitivity of the panchromatic pixel W is higher than that of the color pixel.

In this regard, for the image sensor 10 according to the implementations of the disclosure, multiple panchromatic pixels are added in the 2D pixel array 11. Compared with the general image sensor based on Bayer pixel arrangement or based on QuadBayer pixel arrangement, luminous flux can be increased, allowing a better SNR.

It should be noted that the spectral response of each pixel 101 (i.e., the color of light that the pixel 101 can receive) is determined by the color of the filter 160 corresponding to the pixel 101. Color pixels and panchromatic pixels throughout this disclosure refer to pixels 101 that are capable of responding to light of the same color as the corresponding filter 160.

FIG. 4 to FIG. 15 illustrate multiple examples of arrangements of pixels 101 in the image sensor 10 (illustrated in FIG. 1). Referring to FIG. 4 to FIG. 15, multiple pixels 101 in the 2D pixel array 11 include multiple panchromatic pixels W and multiple color pixels (for example, multiple first color pixels A, multiple second color pixels B, and multiple color pixels C). The color and panchromatic pixels are distinguished by the wavelengths of light that can pass through the filter 160 (illustrated in FIG. 1) overlying the corresponding pixel. The color pixel has a narrower spectral response than the panchromatic pixel. A response spectrum of a color pixel is, for example, a part of a response spectrum of a panchromatic pixel W. The 2D pixel array 11 includes minimal repeating units (FIG. 4 to FIG. 15 illustrate various examples of the minimal repeating units of pixels in image sensors 10). The minimal repeating unit is repeated and arranged in rows and columns. Each minimal repeating unit includes multiple subunits 102, and each subunit 102 includes multiple monochromatic pixels and multiple panchromatic pixels. For example, each minimal repeating unit includes four subunits 102, where one subunit 102 includes multiple monochromatic pixels A (i.e., first color pixels A) and multiple panchromatic pixels W, and two subunits 102 include multiple monochromatic pixels B (i.e., second color pixels B) and multiple panchromatic pixels W, and the remaining one subunit 102 includes multiple monochromatic pixels C (i.e., third color pixels C) and multiple panchromatic pixels W.

For example, the minimal repeating unit has the same number of pixels 101 in rows and columns. For example, the minimal repeating unit has, but is not limited to, 4 rows and 4 columns, 6 rows and 6 columns, 8 rows and 8 columns, or 10 rows and 10 columns. For example, the subunit 102 has the same number of pixels 101 in rows and columns. For example, the subunit 102 includes, but is not limited to, 2 rows and 2 columns, 3 rows and 3 columns, 4 rows and 4 columns, or 5 rows and 5 columns. Such arrangement helps to balance resolution and color performance of the image in the row and column directions, thus improving the display effect.

In an example, in the minimal repeating unit, the panchromatic pixels W are arranged in a first diagonal direction D1, and the color pixels are arranged in a second diagonal direction D2 different from the first diagonal direction D1.

Figure 4:
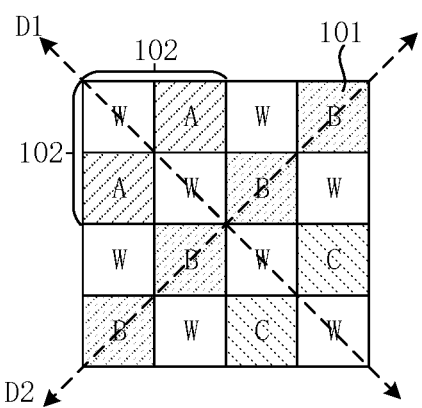

For example, FIG. 4 is a schematic diagram of an arrangement of pixels 101 in a minimal repeating unit in implementations of the disclosure. The minimal repeating unit has 16 pixels in 4 rows and 4 columns, and a subunit 102 has 4 pixels in 2 rows and 2 columns. The 16 pixels are arranged as follow:

W A W B
A W B W
W B W C
B W C W where W represents a panchromatic pixel, A represents a first color pixel in multiple color pixels, B represents a second color pixel in the multiple color pixels, and C represents a third color pixel in the multiple color pixels.

As illustrated in FIG. 4, the panchromatic pixels W are arranged in a first diagonal direction D1 (that is, a direction connecting the upper left corner and the lower right corner in FIG. 4). The color pixels are arranged in a second diagonal direction D2 (such as a direction connecting the lower left corner and the upper right corner in FIG. 4). The first diagonal direction D1 is different from the second diagonal direction D2. For example, the first diagonal line is perpendicular to the second diagonal line.

It should be noted that the first diagonal direction D1 and the second diagonal direction D2 are not limited to the diagonal lines, but also include directions parallel to the diagonal lines. The "direction" herein is not a single direction, but can be understood as the concept of a "straight line" indicating the arrangement, and can be a two-way direction indicated at both ends of the straight line.

Figure 5:
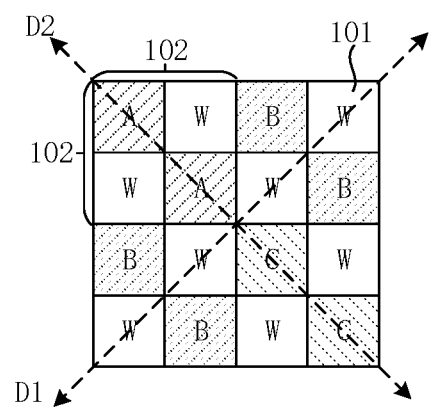

For example, FIG. 5 is a schematic diagram of an arrangement of pixels 101 in another minimal repeating unit in implementations of the disclosure. The minimal repeating unit has 16 pixels 101 in 4 rows and 4 columns, and a subunit 102 has 4 pixels 101 in 2 rows and 2 columns. The 16 pixels are arranged as follow:

A W B W
W A W B
B W C W
W B W C where W represents a panchromatic pixel, A represents a first color pixel in multiple color pixels, B represents a second color pixel in the multiple color pixels, and C represents a third color pixel in the multiple color pixels.

As illustrated in FIG. 5, the panchromatic pixels W are arranged in a first diagonal direction D1 (that is, a direction connecting the upper right corner and the lower left corner in FIG. 5). The color pixels are arranged in a second diagonal direction D2 (such as a direction connecting the upper left corner and the lower right corner in FIG. 5). The first diagonal direction D1 is different from the second diagonal direction D2. For example, the first diagonal line is perpendicular to the second diagonal line.

For example, FIG. 6 is a schematic diagram of an arrangement of pixels 101 in another minimal repeating unit in implementations of the disclosure. FIG. 7 is a schematic diagram of an arrangement of pixels 101 in another minimal repeating unit in implementations of the disclosure. The implementations of FIG. 6 and FIG. 7 correspond to the arrangements of pixels 101 in FIG. 4 and FIG. 5 respectively, where the first color pixel A is a red pixel R, the second color pixel B is a green pixel G, and the third color pixel C is a blue pixel Bu.

It should be noted that, in some implementations, a response waveband of the panchromatic pixel W is a visible band (e.g., 400 nm-760 nm). For example, an infrared filter may be employed on the panchromatic pixel W to filter out infrared lights. In some implementations, the response waveband of the panchromatic pixel is a visible band and a near infrared band (e.g., 400 nm-1000 nm), and is matched with a response waveband of the photoelectric conversion element (such as the photodiode PD) in the image sensor 10. For example, the panchromatic pixel W may not be provided with a filter, and the response waveband of the panchromatic pixel W is determined by the response waveband of the photodiode, and thus the response waveband of the panchromatic pixel W matches the response waveband of the photodiode. The implementations of the disclosure include but are not limited to the above waveband.

In some implementations, in the minimal repeating units illustrated in FIG. 4 and FIG. 5, the first color pixel A may be a red pixel R, the second color pixel B may be a yellow pixel Y, and the third color pixel C may be a blue pixel Bu.

In some implementations, in the minimal repeating units illustrated in FIG. 4 and FIG. 5, the first color pixel A may be a magenta pixel M, the second color pixel B may be a cyan pixel Cy, and the third color pixel C may be a yellow pixel Y.

For example, FIG. 8 is a schematic diagram of an arrangement of pixels 101 in another minimal repeating unit in implementations of the disclosure. The minimal repeating unit has 36 pixels 101 in 6 rows and 6 columns, and a subunit 102 has 9 pixels 101 in 3 rows and 3 columns. The 36 pixels are arranged as follow:

W A W B W B
A W A W B W
W A W B W B
B W B W C W
W B W C W C
B W B W C W where W represents a panchromatic pixel, A represents a first color pixel in multiple color pixels, B represents a second color pixel in the multiple color pixels, and C represents a third color pixel in the multiple color pixels.

As illustrated in FIG. 8, the panchromatic pixels W are arranged in a first diagonal direction D1 (that is, a direction connecting the upper left corner and the lower right corner in FIG. 8). The color pixels are arranged in a second diagonal direction D2 (such as a direction connecting the lower left corner and the upper right corner in FIG. 8). The first diagonal direction D1 is different from the second diagonal direction D2. For example, the first diagonal line is perpendicular to the second diagonal line.

For example, FIG. 9 is a schematic diagram of an arrangement of pixels 101 in another minimal repeating unit in implementations of the disclosure. The minimal repeating unit has 36 pixels 101 in 6 rows and 6 columns, and the subunit 102 has 9 pixels 101 in 3 rows and 3 columns. The 36 pixels are arranged as follow:

A W A W B W
W A W B W B
A W A W B W
W B W C W C
B W B W C W
W B W C W C where W represents a panchromatic pixel, A represents a first color pixel in multiple color pixels, B represents a second color pixel in the multiple color pixels, and C represents a third color pixel in the multiple color pixels.

As illustrated in FIG. 9, the panchromatic pixels W are arranged in a first diagonal direction D1 (that is, a direction connecting the upper right corner and the lower left corner in FIG. 9). The color pixels are arranged in a second diagonal direction D2 (such as a direction connecting the upper left corner and the lower right corner in FIG. 9). The first diagonal direction D1 is different from the second diagonal direction D2. For example, the first diagonal line is perpendicular to the second diagonal line.

For example, in the minimal repeating units illustrated in FIG. 8 and FIG. 9, the first color pixel A is may be red pixel R, the second color pixel B may be a green pixel G, and the third color pixel C may be a blue pixel Bu. Optionally, in the minimal repeating units illustrated in FIG. 8 and FIG. 9, the first color pixel A may be a red pixel R, the second color pixel B may be a yellow pixel Y, and the third color pixel C may be a blue pixel Bu. Optionally, in the minimal repeating units illustrated in FIG. 8 and FIG. 9, the first color pixel A may be a magenta pixel M, the second color pixel B may be a cyan pixel Cy, and the third color pixel C may be a yellow pixel Y.

Figure 10:
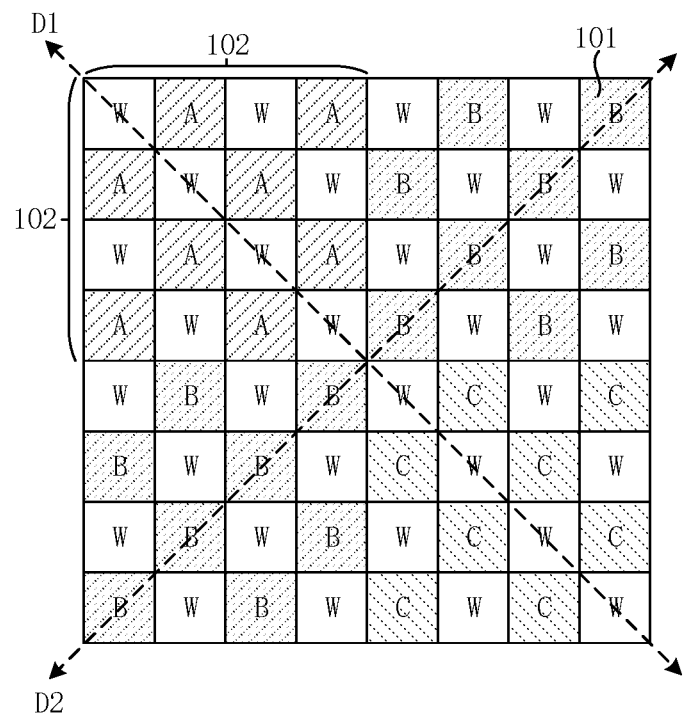

For example, FIG. 10 is a schematic diagram of an arrangement of pixels 101 in another minimal repeating unit in implementations of the disclosure. The minimal repeating unit has 64 pixels 101 in 8 rows and 8 columns, and a subunit 102 has 16 pixels 101 in 4 rows and 4 columns. The 64 pixels are arranged as follow:

W A W A W B W B
A W A W B W B W
W A W A W B W B
A W A W B W B W
W B W B W C W C
B W B W C W C W
W B W B W C W C
B W B W C W C W where W represents a panchromatic pixel, A represents a first color pixel in multiple color pixels, B represents a second color pixel in the multiple color pixels, and C represents a third color pixel in the multiple color pixels.

As illustrated in FIG. 10, the panchromatic pixels W are arranged in a first diagonal direction D1 (that is, a direction connecting the upper left corner and the lower right corner in FIG. 10). The color pixels are arranged in a second diagonal direction D2 (such as a direction connecting the lower left corner and the upper right corner in FIG. 10). The first diagonal direction D1 is different from the second diagonal direction D2. For example, the first diagonal line is perpendicular to the second diagonal line.

Figure 11:
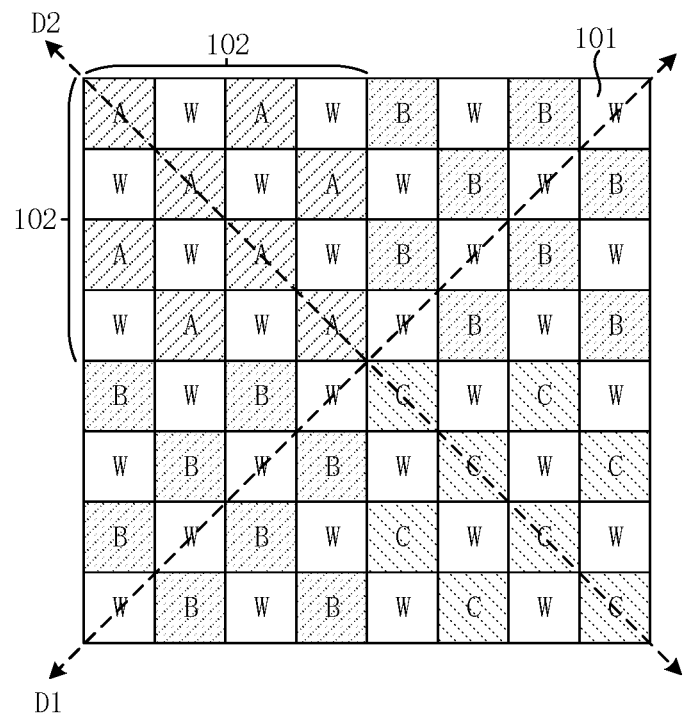

For example, FIG. 11 is a schematic diagram of an arrangement of pixels 101 in another minimal repeating unit in implementations of the disclosure. The minimal repeating unit has 64 pixels 101 in 8 rows and 8 columns, and a subunit 102 has 16 pixels 101 in 4 rows and 4 columns. The 64 pixels are arranged as follow:

A W A W B W B W
W A W A W B W B
A W A W B W B W
W A W A W B W B
B W B W C W C W
W B W B W C W C
B W B W C W C W
W B W B W C W C where W represents a panchromatic pixel, A represents a first color pixel in multiple color pixels, B represents a second color pixel in the multiple color pixels, and C represents a third color pixel in the multiple color pixels.

As illustrated in FIG. 11, the panchromatic pixels W are arranged in a first diagonal direction D1 (that is, a direction connecting the upper right corner and the lower left corner in FIG. 11). The color pixels are arranged in a second diagonal direction D2 (such as a direction connecting the upper left corner and the lower right corner in FIG. 11). The first diagonal direction D1 is different from the second diagonal direction D2. For example, the first diagonal line is perpendicular to the second diagonal line.

In the examples of FIG. 4 to FIG. 11, in each subunit 102, adjacent panchromatic pixels W are arranged diagonally, and adjacent color pixels are also arranged diagonally. In another example, in each subunit 102, adjacent panchromatic pixels are arranged horizontally and adjacent color pixels are also arranged horizontally, or adjacent panchromatic pixels are arranged vertically and adjacent color pixels are also arranged vertically. Panchromatic pixels in adjacent subunits 102 may be arranged horizontally or vertically, and color pixels in adjacent subunits 102 may also be arranged in horizontally or vertically.

Figure 12:
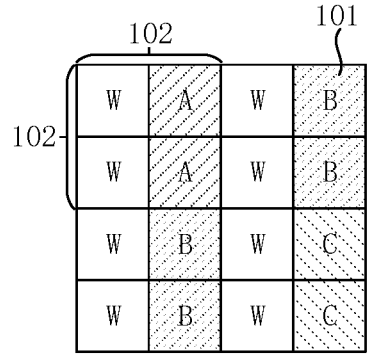

For example, FIG. 12 is a schematic diagram of an arrangement of pixels 101 in another minimal repeating unit in implementations of the disclosure. The minimal repeating unit has 16 pixels 101 in 4 rows and 4 columns, and a subunit 102 has 4 pixels 101 in 2 rows and 2 columns. The 16 pixels are arranged as follow:

W A W B
W A W B
W B W C
W B W C where W represents a panchromatic pixel, A represents a first color pixel in multiple color pixels, B represents a second color pixel in the multiple color pixels, and C represents a third color pixel in the multiple color pixels.

As illustrated in FIG. 12, in each subunit 102, adjacent panchromatic pixels W are arranged vertically, and adjacent color pixels are also arranged vertically.

Figure 13:
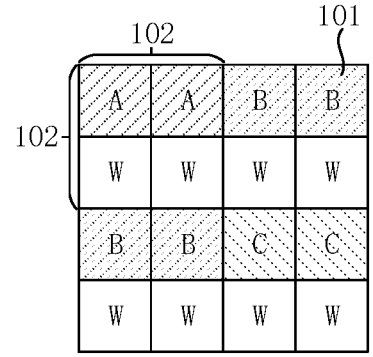

For example, FIG. 13 is a schematic diagram of an arrangement of pixels 101 in another minimal repeating unit in implementations of the disclosure. The minimal repeating unit has 16 pixels 101 in 4 rows and 4 columns, and a subunit 102 has 4 pixels 101 in 2 rows and 2 columns. The 16 pixels are arranged as follow:

A A B B
W W W W
B B C C
W W W W where W represents a panchromatic pixel, A represents a first color pixel in multiple color pixels, B represents a second color pixel in the multiple color pixels, and C represents a third color pixel in the multiple color pixels.

As illustrated in FIG. 13, in each subunit 102, adjacent panchromatic pixels W are arranged horizontally, and adjacent color pixels are also arranged horizontally.

Figure 14:
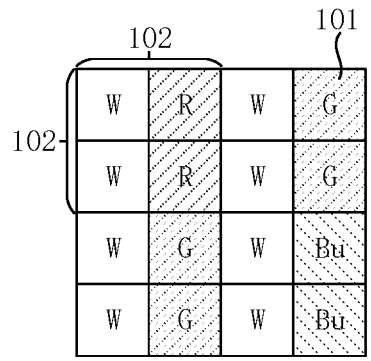
Figure 15:
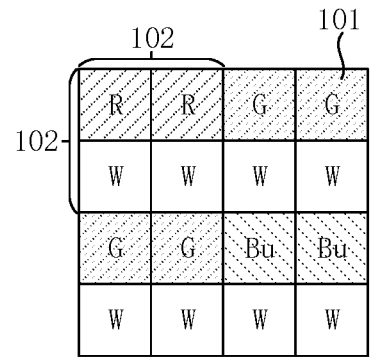

For example, FIG. 14 is a schematic diagram of an arrangement of pixels 101 in another minimal repeating unit in implementations of the disclosure. FIG. 15 is a schematic diagram of an arrangement of pixels 101 in another minimal repeating unit in implementations of the disclosure. Implementations of FIG. 14 and FIG. 15 correspond to arrangements of pixels in FIG. 12 and FIG. 13, where the first color pixel A may be red pixel R, the second color pixel B may be a green pixel G, and the third color pixel C may be a blue pixel Bu.

In some implementations, in the minimal repeating units illustrated in FIG. 12 and FIG. 13, the first color pixel A may be a red pixel R, the second color pixel B may be a yellow pixel Y, and the third color pixel C may be a blue pixel Bu.

In some implementations, in the minimal repeating units illustrated in FIG. 12 and FIG. 13, the first color pixel A may be a magenta pixel M, the second color pixel B may be a cyan pixel Cy, and the third color pixel C may be a yellow pixel Y.

The multiple panchromatic pixels and multiple color pixels in the 2D pixel array 11 of any arrangement illustrated in FIG. 4 to FIG. 15 can be controlled by different exposure control lines, so as to realize independent control of exposure duration of the panchromatic pixels and exposure duration of color pixels. Control terminals of the exposure control circuits of at least two panchromatic pixels adjacent in the first diagonal direction are electrically connected to the first exposure control line, and control terminals of at least two color pixels adjacent in the second diagonal direction are electrically connected to the second exposure control line. A first exposure signal may be transmitted through the first exposure control line to control the first exposure duration of the panchromatic pixels, and a second exposure signal may be transmitted through the second exposure control line to control the second exposure duration of the color pixels.

When the exposure duration for the panchromatic pixels and the exposure duration for the color pixels are independently controlled, the first exposure duration for the panchromatic pixels may be shorter than the second exposure duration for the color pixels. For example, a ratio of the first exposure duration to the second exposure duration may be one of 1:2, 1:3, and 1:4. For example, in a dark environment, the color pixels are more likely to be underexposed. Therefore, the ratio of the first exposure duration to the second exposure duration can be set to be 1:2, 1:3, or 1:4 according to ambient brightness. When the exposure ratio is the above integer ratio or close to the integer ratio, it is advantageous for the setting of timing and the setting and control of signals.

In some implementations, a relative relationship between the first exposure duration and the second exposure duration may be determined according to ambient brightness. For example, in case that the ambient brightness is less than or equal to a brightness threshold, the panchromatic pixels are exposed for the first exposure duration that is equal to the second exposure duration. In case that the ambient brightness is greater than the brightness threshold, the panchromatic pixels are exposed for the first exposure duration that is less than the second exposure duration. The relative relationship between the first exposure duration and the second exposure duration may be determined according to a brightness difference between the ambient brightness and the brightness threshold in case that the ambient brightness is greater than the brightness threshold. For example, the greater the brightness difference, the smaller the ratio of the first exposure duration to the second exposure duration. For example, when the brightness difference is within a first range [a,b), the ratio of the first exposure duration to the second exposure duration is 1:2; when the brightness difference is within a second range [b,c), the ratio of the first exposure duration to the second exposure duration is 1:3; and when the brightness difference is greater than or equal to c, the ratio of the first exposure duration to the second exposure duration is 1:4.

Referring to FIG. 1 and FIG. 16, the control method in implementations of the disclosure may be applied to the image sensor 10 in any of the implementations above. The control method includes operations 01 and 02.
- 01: Original image data is obtained by controlling exposure of the 2D pixel array 11, where the original image data includes color original image data generated by exposure of the color pixels and panchromatic original image data generated by exposure of the panchromatic pixels.
- 02: Target image data is outputted according to the original image data.

Referring to FIG. 1 and FIG. 17, the control method of the implementations of the disclosure can be implemented by the camera assembly 40. The camera assembly 40 includes the image sensor 10 of any of the above-described implementations and a processor 20. The processor 20 may be integrated within the image sensor 10 or independently provided outside the image sensor 10. Operations 01 and 02 may be implemented by the processor 20. That is, the processor 20 can be configured to obtain original image data by controlling exposure of the 2D pixel array 11, and to output target image data according to the original image data, where the original image data includes color original image data generated by exposure of the color pixels and panchromatic original image data generated by exposure of the panchromatic pixels.

According to the control method and the camera assembly 40 in implementations of the disclosure, multiple panchromatic pixels are added in the 2D pixel array 11. Compared with the general image sensor based on Bayer pixel arrangement or based on QuadBayer pixel arrangement, luminous flux can be increased, allowing a better SNR. According to the control method and the camera assembly 40 in implementations of the disclosure, exposure of the 2D pixel array is controlled to obtain the original image data, and the target image data is outputted according to the original image data, so that a data output structure of the output target image data can be matched with back-end algorithms and hardware functions.

The original image data obtained by the exposure of the 2D pixel array 11 may be completely corresponding the pixels 101 in the 2D pixel array 11 in terms of arrangement. That is, the color original image data is obtained by exposure of the color pixels in the 2D pixel array 11, and the panchromatic original image data is obtained by exposure of the panchromatic pixels in the 2D pixel array 11.

Referring to FIG. 17 and FIG. 18, in some implementations, the target image data is outputted according to the original image data (i.e., operation 02) as follow.
- 021: In a first data-reading mode, the target image data is outputted by reading the original image data row-by-row.

Referring to FIG. 17, in some implementations, operation 021 may be implemented by the processor 20. That is, the processor 20 may be configured to, in a first data-reading mode, output the target image data by reading the original image data row-by-row.

Specifically, the first data-reading mode is suitable for scenarios requiring full-size resolution or high resolution, or scenarios with high ambient brightness. When the processor 20 reads out the original image data row-by-row to output the target image data, the data output structure of the target image data completely corresponds to the arrangement of the pixels 101 in the 2D pixel array 11. The data-reading method of this implementation of the disclosure has advantages of less calculation and high speed.

Figure 19:
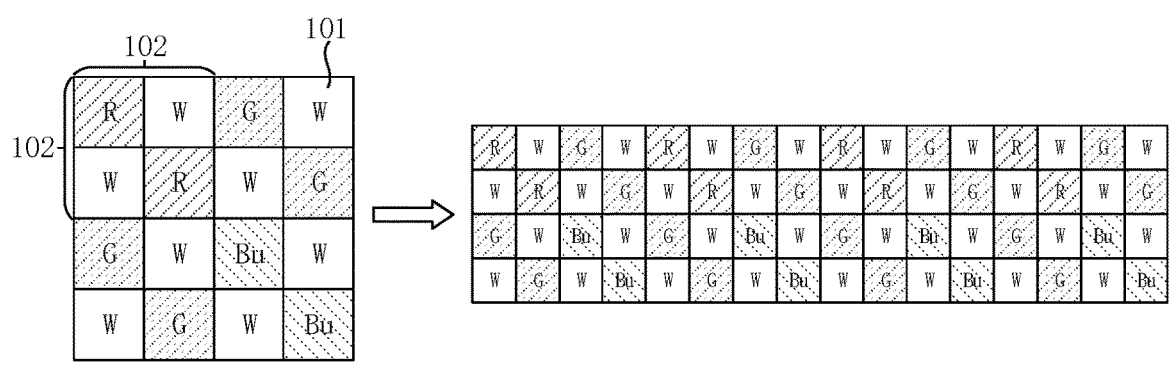
FIG. 19 and FIG. 20 are schematic diagrams illustrating a principle of a control method in some implementations of the disclosure.

Referring to FIG. 19, in an example, the minimal repeating unit includes 4 subunits 102, which are respectively denoted as subunit U1, subunit U2, subunit U3, and subunit U4 from left to right and from top to bottom. The minimal repeating unit includes 16 pixels 101, which are denoted from left to right and from top to bottom as: color pixel R11, panchromatic pixel W12, color pixel G13, panchromatic pixel W14, panchromatic pixel W21, color pixel R22, panchromatic pixel W23, color pixel G24, color pixel G31, panchromatic pixel W32, color pixel B33, panchromatic pixel W34, panchromatic pixel W41, color pixel G42, panchromatic pixel W43, color pixel B44. That is, subunit U1 includes color pixel R11, panchromatic pixel W12, panchromatic pixel W21, and color pixel R22, subunit U2 includes color pixel G13, panchromatic pixel W14, panchromatic pixel W23, and color pixel G24, subunit U3 includes color pixel G31, panchromatic pixel W32, panchromatic pixel W41, and color pixel G42, and subunit U4 includes color pixel B33, panchromatic pixel W34, panchromatic pixel W43, and color pixel B44.

In the first data-reading mode, the processor 20 reads out the original image data row-by-row to output the target image data. For example, when the 2D pixel array 11 includes 4 minimal repeating units and the 4 minimal repeating units are arranged horizontally, the target image data outputted by the processor 20 reading the original image data row-by-row is: color original image data of color pixel R11, panchromatic original image data of panchromatic pixel W12, color original image data of color pixel G13, panchromatic original image data of panchromatic pixel W14 . . . panchromatic original image data of panchromatic pixel W21, color original image data of color pixel R22, panchromatic original image data of panchromatic pixel W23, color original image data of color pixel G24 . . . color original image data of color pixel G31, panchromatic original image data of panchromatic pixel W32, color original image data of color pixel B33, panchromatic original image data of panchromatic pixel W34 . . . panchromatic original image data of panchromatic pixel W41, color original image data of color pixel G42, panchromatic original image data of panchromatic pixel W43, color original image data of color pixel B44, and so on. In the implementation of the disclosure, in each subunit 102, adjacent panchromatic pixels are arranged diagonally, and adjacent color pixels are also arranged diagonally.

Figure 20:
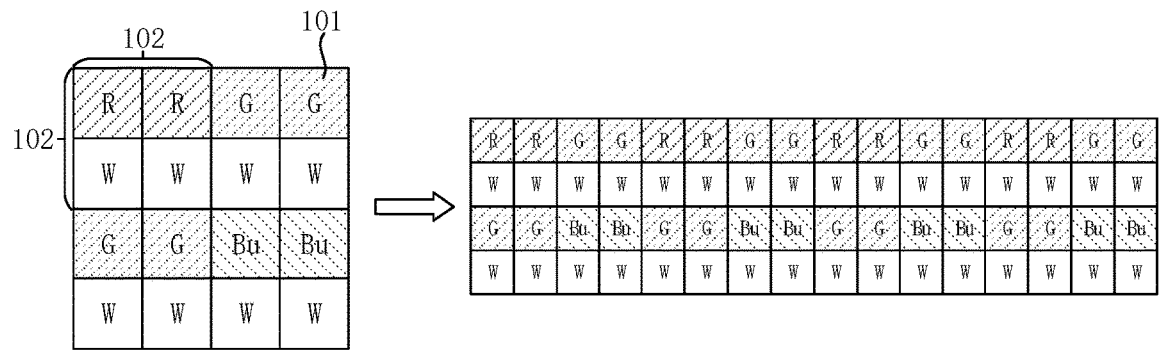

Referring to FIG. 20, in an example, the minimal repeating unit includes 4 subunits 102, which are respectively denoted as subunit U1, subunit U2, subunit U3, and subunit U4 from left to right and from top to bottom. The minimal repeating unit includes 16 pixels 101, which are denoted from left to right and from top to bottom as: color pixel R11, color pixel R12, color pixel G13, color pixel G14, panchromatic pixel W21, panchromatic pixel W22, panchromatic pixel W23, panchromatic pixel W24, color pixel G31, color pixel G32, color pixel B33, color pixel B34, panchromatic pixel W41, panchromatic pixel W42, panchromatic pixel W43, panchromatic pixel W44. That is to say, subunit U1 includes color pixel R11, color pixel R12, panchromatic pixel W21, and panchromatic pixel W22, subunit U2 includes color pixel G13, color pixel G14, panchromatic pixel W23, and panchromatic pixel W24, subunit U3 includes color pixel G31, color pixel G32, panchromatic pixel W41, and panchromatic pixel W42, and subunit U4 includes color pixel B33, color pixel B34, panchromatic pixel W43, and panchromatic pixel W44.

In the first data-reading mode, the processor 20 reads out the original image data row-by-row to output the target image data. For example, when the 2D pixel array 11 includes 4 minimal repeating units and the 4 minimal repeating units are arranged horizontally, the target image data outputted by the processor 20 reading the original image data row-by-row is: color original image data of color pixel R11, color original image data of color pixel R12, color original image data of color pixel G13, color original image data of color pixel G14 . . . panchromatic original image data of panchromatic pixel W21, panchromatic original image data of panchromatic pixel W22, panchromatic original image data of panchromatic pixel W23, panchromatic original image data of panchromatic pixel W24 . . . color original image data of color pixel G31, color original image data of color pixel G32, color original image data of color pixel B33, color original image data of color pixel B34 . . . panchromatic original image data of panchromatic pixel W41, panchromatic original image data of panchromatic pixel W42, panchromatic original image data of panchromatic pixel W43, panchromatic original image data of panchromatic pixel W44 . . . . In the implementation of the disclosure, in each subunit 102, in each subunit 102, adjacent panchromatic pixels are arranged horizontally, and adjacent color pixels are also arranged horizontally (or in other words, in the 2D pixel array 11, the color pixels and panchromatic pixels are arranged row-by-row, that is, one row of color pixels, one row of panchromatic pixels, and so on; or one row of panchromatic pixels, one row of color pixels, and so on).

In other examples, the arrangement of the pixels 101 of the minimal repeating unit may also be as follows. Adjacent panchromatic pixels may be arranged vertically, and adjacent color pixels may also be arranged vertically (or in other words, in the 2D pixel array 11, color pixels and panchromatic pixels are arranged column-by-column, that is, a column of color pixels a column of panchromatic pixels, and so on; or a column of panchromatic pixels, a column of color pixels, and so on). In this case, in the first data-reading mode, the processor 20 may also read the original image data row-by-row to output the target image data, which will not be described in detail one by one herein.

It should be noted that, since in the examples illustrated in FIG. 19 and FIG. 20 the original image data obtained by the exposure of the 2D pixel array 11 completely corresponds to the pixels 101 in the 2D pixel array 11 in terms of arrangement, illustrations of the original image data are omitted in FIG. 19 and FIG. 20.

Referring to FIG. 17 and FIG. 21, in some implementations, the target image data includes first target image data and second target image data. The target image data is outputted according to the original image data (i.e., operation 02) as follow.

022: In a second data-reading mode, the first target image data is obtained according to the color original image data generated by exposure of the multiple color pixels in each subunit 102, and the second target image data is obtained according to the color original image data generated by exposure of the multiple color pixels in each subunit 102 and the panchromatic original image data generated by exposure of the multiple panchromatic pixels in each subunit 102.

Referring to FIG. 17, in some implementations, the target image data includes first target image data and second target image data. Operation 022 may be implemented by the processor 20. That is, the processor 20 may be configured to, in a second data-reading mode, obtain the first target image data according to the color original image data generated by exposure of the multiple color pixels in each subunit 102, and obtain the second target image data according to the color original image data generated by exposure of the multiple color pixels in each subunit 102 and the panchromatic original image data generated by exposure of the multiple panchromatic pixels in each subunit 102.

Specifically, the second data-reading mode is suitable for most scenarios, and is especially suitable for scenarios with low ambient brightness.

Figure 22:
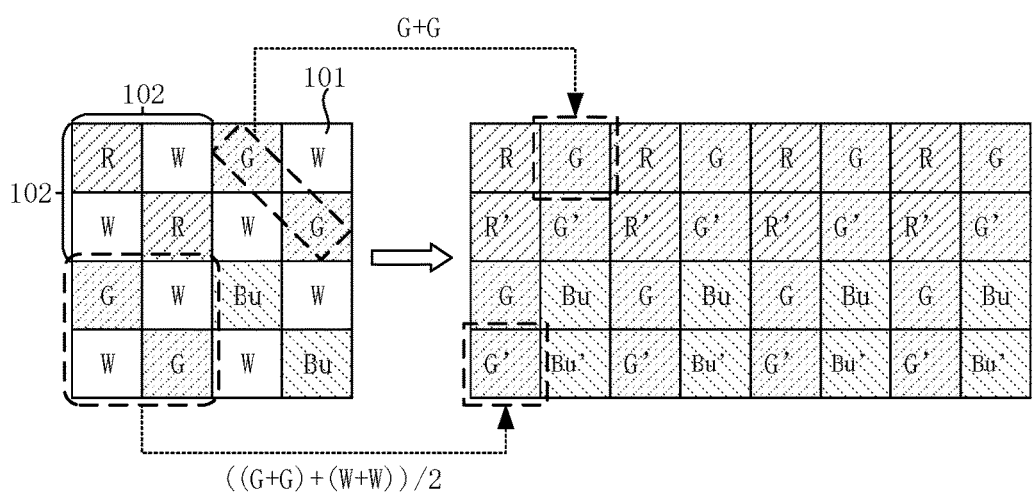
FIG. 22 is a schematic diagram illustrating a principle of a control method in some implementations of the disclosure.

Referring to FIG. 22, in an example, the minimal repeating unit includes 4 subunits 102, and the minimal repeating unit includes 16 pixels 101. The 4 subunits 102 and the 16 pixels 101 in FIG. 22 are denoted similarly to the 4 subunits 102 and the 16 pixels 101 in FIG. 19, which will not be described in detail herein.

In the second data-reading mode, the processor 20 obtains the first target image data according to the color original image data generated by the exposure of the multiple color pixels in each subunit 102, and obtains the second target image data according to the color original image data generated by the exposure of the multiple color pixels in each subunit 102 and the panchromatic original image data generated by the exposure of multiple panchromatic pixels in each subunit 102. Specifically, in the example of FIG. 22, the processor 20 may obtain the first target image data according to the color original image data generated by the exposure of multiple color pixels arranged diagonally in each subunit 102, and obtains the second target image data according to the color original image data generated by the exposure of the multiple color pixels arranged diagonally in each subunit 102 and the panchromatic original image data generated by the exposure of multiple panchromatic pixels arranged diagonally in each subunit 102. In an example of another arrangement of pixels 101, the processor 20 may obtain the first target image data according to the color original image data generated by the exposure of the multiple color pixels arranged horizontally in each subunit 102, and obtain the second target image data according to the color original image data generated by the exposure of the multiple color pixels arranged horizontally in each subunit 102 and the panchromatic original image data generated by the exposure of multiple panchromatic pixels arranged horizontally in each subunit 102. Optionally, the processor 20 may obtain the first target image data according to the color original image data generated by the exposure of the multiple color pixels arranged vertically in each subunit 102, and obtain the second target image data according to the color original image data generated by the exposure of the multiple color pixels arranged vertically in each subunit 102 and the panchromatic original image data generated by the exposure of multiple panchromatic pixels arranged vertically in each subunit 102.

For example, when the 2D pixel array 11 includes 4 minimal repeating units and the 4 minimal repeating units are arranged horizontally, the target image data outputted by the processor 20 according to the original image data is: the first target image data obtained according to the color original image data of the color pixel R11 and the color original image data of the color pixel R22, the first target image data obtained according to the color original image data of the color pixel G13 and the color original image data of the color pixel G24 . . . the second target image data obtained according to the color original image data of the color pixel R11, the color original image data of the color pixel R22, the panchromatic original image data of the panchromatic pixel W12 and the panchromatic original image data of the panchromatic pixel W21, the second target image data obtained according to the color original image data of the color pixel G13, the color original image data of the color pixel G24, the panchromatic original image data of the panchromatic pixel W14, and the panchromatic original image data of the panchromatic pixel W23 . . . the first target image data obtained according to the color original image data of the color pixel G31 and the color original image data of the color pixel G42, the first target image data obtained according to the color original image data of the color pixel B33 and the color original image data of the color pixel B44 . . . the second target image data obtained according to the color original image data of the color pixel G31, the color original image data of the color pixel G42, the panchromatic original image data of the panchromatic pixel W32, and the panchromatic original image data of the panchromatic pixel W41, the second target image data obtained according to the color original image data of the color pixel B33, the color original image data of the color pixel B44, the panchromatic original image data of the panchromatic pixel W34, and the panchromatic original image data of the panchromatic pixel W43, and so on. In the implementation of the disclosure, one row of target image data includes the first target image data obtained according to color original image data of multiple color pixels, and one row of target image data include the second target image data obtain according to color original image data of multiple color pixels and panchromatic original image data of multiple panchromatic pixels. Since the panchromatic original image data of multiple panchromatic pixels is fused into the second target image data, the SNR of the image sensor 10 can be improved.

In other examples, when the ambient brightness is extremely low, the second target image data may be obtained as follows instead. The processor 20 obtains the second target image data according to the panchromatic original image data generated by exposure of multiple panchromatic pixels in each subunit 102. For example, the processor 20 performs pixel addition on the panchromatic original image data generated by exposure of multiple panchromatic pixels in each subunit 102 to obtain the second target image data.

It should be noted that, in the example of FIG. 22, since the original image data obtained by the exposure of the 2D pixel array 11 completely corresponds to the pixels 101 in the 2D pixel array 11 in terms of arrangement, illustrations of the original image data are omitted in FIG. 22.

Referring to FIG. 17 and FIG. 23, in some implementations, the first target image data is obtained according to the color original image data generated by exposure of the multiple color pixels in each subunit 102 as follows.

0221: The first target image data is obtained by performing pixel addition on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.

0222: Pixel addition is performed on the color original image data generated by exposure of the multiple color pixels in each subunit 102, and pixel addition is performed on the panchromatic original image data generated by exposure of the multiple panchromatic pixels in each subunit 102.

0223: The second target image data is obtained by performing pixel averaging on the color original image data subjected to pixel addition and the panchromatic original image data subjected to pixel addition.

Referring to FIG. 17, in some implementations, operation 0221, operation 0222, and operation 0223 may be implemented by the processor 20. That is, the processor 20 may be configured to obtain the first target image data by performing pixel addition on the color original image data generated by exposure of the multiple color pixels in each subunit 102, perform pixel addition on the color original image data generated by exposure of the multiple color pixels in each subunit 102, perform pixel addition on the panchromatic original image data generated by exposure of the multiple panchromatic pixels in each subunit 102, and obtain the second target image data by performing pixel averaging on the color original image data subjected to pixel addition and the panchromatic original image data subjected to pixel addition.

Specifically, still referring to FIG. 22, the first target image data may include, in the right image of FIG. 22, the first target image data at the color pixel R, the first target image data at the color pixel G, and the first target image data at the color pixel B. The second target image data may include, in the right image of FIG. 22, the second target image data at the color pixel R', the second target image data at the color pixel G', and the second target image data at the color pixel B'.

For subunit U1, the processor 20 performs pixel addition (also referred to as Analog sum) on the color original image data of color pixel R11 and the color original image data of color pixel R22 in the left image of FIG. 22, to obtain the first target image data at color pixel R11 in the right image of FIG. 22. The processor 20 performs pixel addition on the color original image data of color pixel R11 and the color original image data of color pixel R22 in the left image of FIG. 22, performs pixel addition on the panchromatic original image data of panchromatic pixel W12 and the panchromatic original image data of panchromatic pixel W21, and then performs pixel averaging (also referred to as Digital avg) on the color original image data subjected to pixel addition and the panchromatic original image data subjected to pixel addition, to obtain the second target image data at color pixel R'21 in the right image of FIG. 22.

For subunit U2, the processor 20 performs pixel addition on the color original image data of color pixel G13 and the color original image data of color pixel G24 in the left image of FIG. 22, to obtain the first target image data at color pixel G12 in the right image of FIG. 22. The processor 20 performs pixel addition on the color original image data of color pixel G13 and the color original image data of color pixel G24 in the left image of FIG. 22, performs pixel addition on the panchromatic original image data of panchromatic pixel W14 and the panchromatic original image data of panchromatic pixel W23, and then performs pixel averaging on the color original image data subjected to pixel addition and the panchromatic original image data subjected to pixel addition, to obtain the second target image data at the color pixel G'22 in the right image of FIG. 22.

For subunit U3, the processor 20 performs pixel addition on the color original image data of color pixel G31 and the color original image data of color pixel G42 in the left image of FIG. 22, to obtain the first target image data at color pixel G31 in the right image of FIG. 22. The processor 20 performs pixel addition on the color original image data of color pixel G31 and the color original image data of color pixel G42 in the left image of FIG. 22, performs pixel addition on the panchromatic original image data of panchromatic pixel W32 and the panchromatic original image data of panchromatic pixel W41, and then performs pixel averaging on the color original image data subjected to pixel addition and the panchromatic original image data subjected to pixel addition, to obtain the second target image data at color pixel G'41 in the right image of FIG. 22.

For subunit U4, the processor 20 performs pixel addition on the color original image data of color pixel B33 and the color original image data of color pixel B44 in the left image of FIG. 22, to obtain the first target image data at color pixel B32 in the right image of FIG. 22. The processor 20 performs pixel addition on the color original image data of color pixel B33 and the color original image data of color pixel B44 in the left image of FIG. 22, performs pixel addition on the panchromatic original image data of panchromatic pixel W34 and the panchromatic original image data of panchromatic pixel W43, and then performs pixel averaging on the color original image data subjected to pixel addition and the panchromatic original image data subjected to pixel addition, to obtain the second target image data at color pixel B'42 in the right image of FIG. 22.

Referring to FIG. 17 and FIG. 24, in some implementations, the first target image data is obtained according to the color original image data generated by exposure of the multiple color pixels in each subunit 102 as follows.

0224: The first target image data is obtained by performing pixel averaging on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.

0225: The second target image data is obtained by performing pixel averaging on the color original image data generated by exposure of the multiple color pixels in each subunit 102 and the panchromatic original image data generated by exposure of the multiple panchromatic pixels in each subunit 102.

Referring to FIG. 17, in some implementations, operation 0224 and operation 0225 may be implemented by the processor 20. That is, the processor 20 may be configured to obtain the first target image data by performing pixel averaging on the color original image data generated by exposure of the multiple color pixels in each subunit 102, and obtain the second target image data by performing pixel averaging on the color original image data generated by exposure of the multiple color pixels in each subunit 102 and the panchromatic original image data generated by exposure of the multiple panchromatic pixels in each subunit 102.

Referring to FIG. 25, in an example, the minimal repeating unit includes 4 subunits 102, and the minimal repeating unit includes 16 pixels 101. The 4 subunits 102 and the 16 pixels 101 in FIG. 25 are denoted similarly to the 4 subunits 102 and the 16 pixels 101 in FIG. 19, and will not be described in detail herein.

The first target image data may include the first target image data at the color pixel R, the first target image data at the color pixel G, and the first target image data at the color pixel B in the right image of FIG. 25. The second target image data may include the second target image data at the color pixel R', the second target image data at the color pixel G', and the second target image data at the color pixel B' in the right image of FIG. 25.

For subunit U1, the processor 20 performs pixel averaging on the color original image data of color pixel R11 and the color original image data of color pixel R22 in the left image of FIG. 25, to obtain the first target image data at color pixel R11 in the right image of FIG. 25. The processor 20 performs pixel averaging on the color original image data of color pixel R11, the color original image data of color pixel R22, the panchromatic original image data of panchromatic pixel W12, and the panchromatic original image data of panchromatic pixel W21 in the left image of FIG. 25, to obtain the second target image data at color pixel R'21 in the right image of FIG. 25.

For subunit U2, the processor 20 performs pixel averaging on the color original image data of color pixel G13 and the color original image data of color pixel G24 in the left image of FIG. 25, to obtain the first target image data at color pixel G12 in the right image of FIG. 25. The processor 20 performs pixel averaging on the color original image data of color pixel G13, the color original image data of color pixel G24, the panchromatic original image data of panchromatic pixel W14, and the panchromatic original image data of panchromatic pixel W23 in the left image of FIG. 25, to obtain the second target image data at color pixel G'22 in the right image of FIG. 25.

For subunit U3, the processor 20 performs pixel averaging on the color original image data of color pixel G31 and the color original image data of color pixel G42 in the left image of FIG. 25, to obtain the first target image data at color pixel G31 in the right image of FIG. 25. The processor 20 performs pixel averaging on the color original image data of color pixel G31, the color original image data of color pixel G42, the panchromatic original image data of panchromatic pixel W32, and the panchromatic original image data of panchromatic pixel W41 in the left image of FIG. 25, to obtain the second target image data at color pixel G'41 in the right image of FIG. 25.

For subunit U4, the processor 20 performs pixel averaging on the color original image data of color pixel B33 and the color original image data of color pixel B44 in the left image of FIG. 25, to obtain the first target image data at color pixel B32 in the right image of FIG. 25. The processor 20 performs pixel averaging on the color original image data of color pixel B33, the color original image data of color pixel B44, the panchromatic original image data of panchromatic pixel W34, and the panchromatic original image data of panchromatic pixel W43 in the left image of FIG. 25, to obtain the second target image data at color pixel B'42 in the right image of FIG. 25.

Referring to FIG. 17 and FIG. 26, in some implementations, the first target image data is obtained according to the color original image data generated by exposure of the multiple color pixels in each subunit 102 as follows.

0226: The first target image data is obtained by performing pixel addition on the color original image data generated by exposure of the multiple color pixels in each subunit 102.

The second target image data is obtained according to the color original image data generated by exposure of the multiple color pixels in each subunit 102 and the panchromatic original image data generated by exposure of the multiple panchromatic pixels in each subunit 102 as follows.

0227: the second target image data is obtained by performing pixel addition on the color original image data generated by exposure of the multiple color pixels in each subunit 102 and the panchromatic original image data generated by exposure of the multiple panchromatic pixels in each subunit 102.

Referring to FIG. 17, in some implementations, operation 0226 and operation 0227 may be implemented by the processor 20. That is, the processor 20 may be configured to obtain the first target image data by performing pixel addition on the color original image data generated by exposure of the multiple color pixels in each subunit 102, and obtain the second target image data by performing pixel addition on the color original image data generated by exposure of the multiple color pixels in each subunit 102 and the panchromatic original image data generated by exposure of the multiple panchromatic pixels in each subunit 102.

Figure 27:
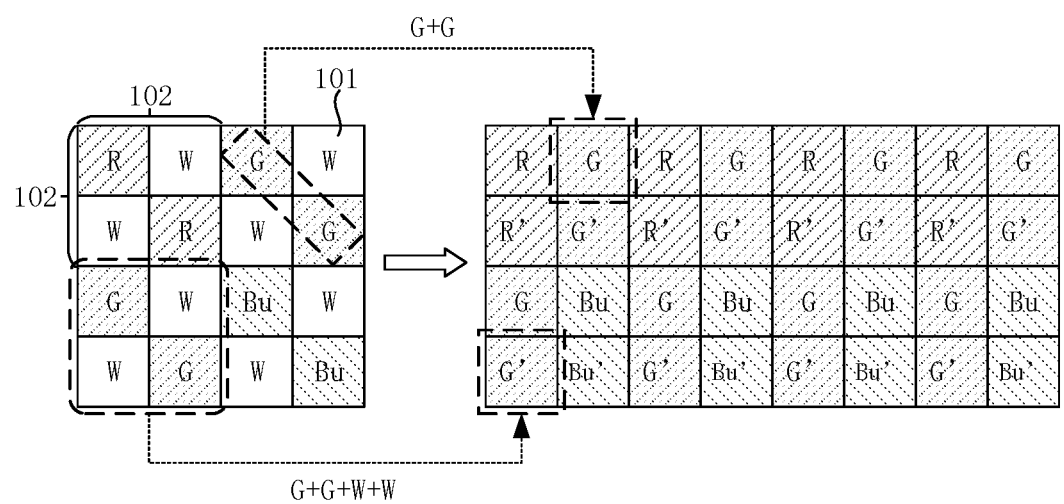
FIG. 27 is a schematic diagram illustrating a principle of a control method in some implementations of the disclosure.

Referring to FIG. 27, in an example, the minimal repeating unit includes 4 subunits 102, and the minimal repeating unit includes 16 pixels 101. The 4 subunits 102 and the 16 pixels 101 in FIG. 27 are denoted similarly to the 4 subunits 102 and the 16 pixels 101 in FIG. 19, and will not be described in detail herein.

The first target image data includes the first target image data at the color pixel R, the first target image data at the color pixel G, and the first target image data at the color pixel B in the right image of FIG. 27. The second target image data may include the second target image data at the color pixel R', the second target image data at the color pixel G', and the second target image data at the color pixel B' in the right image of FIG. 27.

For subunit U1, the processor 20 performs pixel addition on the color original image data of color pixel R11 and the color original image data of color pixel R22 in the left image of FIG. 27, to obtain the first target image data at color pixel R11 in the right image of FIG. 27. The processor 20 performs pixel addition on the color original image data of color pixel R11, the color original image data of color pixel R22, the panchromatic original image data of panchromatic pixel W12, and the panchromatic original image data of panchromatic pixel W21 in the left image of FIG. 27, to obtain the second target image data at color pixel R'21 in the right image of FIG. 27.

For subunit U2, the processor 20 performs pixel addition on the color original image data of color pixel G13 and the color original image data of color pixel G24 in the left image of FIG. 27, to obtain the first target image data at color pixel G12 in the right image of FIG. 27. The processor 20 performs pixel addition on the color original image data of color pixel G13, the color original image data of color pixel G24, the panchromatic original image data of panchromatic pixel W14, and the panchromatic original image data of panchromatic pixel W23 in the left image of FIG. 27, to obtain the second target image data at color pixel G'22 in the right image of FIG. 27.

For subunit U3, the processor 20 performs pixel addition on the color original image data of color pixel G31 and the color original image data of color pixel G42 in the left image of FIG. 27, to obtain the first target image data at color pixel G31 in the right image of FIG. 27. The processor 20 performs pixel addition on the color original image data of color pixel G31, the color original image data of color pixel G42, the panchromatic original image data of panchromatic pixel W32, and the panchromatic original image data the panchromatic pixel W41 in the left image of FIG. 27, to obtain the second target image data at color pixel G'41 in the right image of FIG. 27.

For subunit U4, the processor 20 performs pixel addition on the color original image data of color pixel B33 and the color original image data of color pixel B44 in the left image of FIG. 27, to obtain the first target image data at color pixel B32 in the right image of FIG. 27. The processor 20 performs pixel addition on the color original image data of color pixel B33, the color original image data of color pixel B44, the panchromatic original image data of panchromatic pixel W34, and the panchromatic original image data of panchromatic pixel W43 in the left image of FIG. 27, to obtain the second target image data at color pixel B'42 in the right image of FIG. 27.

Referring to FIG. 17 and FIG. 28, in some implementations, the original image data is obtained by controlling exposure of the 2D pixel array 11 (i.e., operation 01) as follows.

011: First original image data is obtained by controlling multiple color pixels and multiple panchromatic pixels in a (2n−1)-th row to be exposed for a first exposure duration, second original image data is obtained by controlling multiple color pixels and multiple panchromatic pixels in a 2n-th row to be exposed for a second exposure duration, where n is a natural number greater than or equal to 1, the first exposure duration is different from the second exposure duration, the first original image data includes first color original image data generated by exposure of the color pixels and first panchromatic original image data generated by exposure of the panchromatic pixels, and the second original image data includes second color original image data generated by exposure of the color pixels and second panchromatic original image data generated by exposure of the panchromatic pixels.

The target image data includes first target image data, second target image data, third target image data, and fourth target image data. The target image data is outputted according to the original image data (i.e., operation 02) as follows.

023: In a third data-reading mode, the first target image data is obtained according to the first color original image data generated by exposure of the color pixels in each subunit 102 for the first exposure duration, the second target image data is obtained according to the second color original image data generated by exposure of the color pixels in each subunit 102 for the second exposure duration, the third target image data is obtained according to the first color original image data generated by exposure of the color pixels in each subunit 102 for the first exposure duration and the first panchromatic original image data generated by exposure of the panchromatic pixels in each subunit 102 for the first exposure duration, and the fourth target image data is obtained according to the second color original image data generated by exposure of the color pixels in each subunit 102 for the second exposure duration and the second panchromatic original image data generated by exposure of the panchromatic pixels in each subunit 102 for the second exposure duration.

Referring to FIG. 17, in some implementations, operation 011 and operation 023 may be implemented by the processor 20. That is, the processor 20 may be configured to obtain first original image data by controlling multiple color pixels and multiple panchromatic pixels in a (2n−1)-th row to be exposed for a first exposure duration, and obtain second original image data by controlling multiple color pixels and multiple panchromatic pixels in a 2n-th row to be exposed for a second exposure duration, where n is a natural number greater than or equal to 1, the first exposure duration is different from the second exposure duration, the first original image data includes first color original image data generated by exposure of the color pixels and first panchromatic original image data generated by exposure of the panchromatic pixels, and the second original image data includes second color original image data generated by exposure of the color pixels and second panchromatic original image data generated by exposure of the panchromatic pixels. The target image data includes first target image data, second target image data, third target image data, and fourth target image data. The processor may be further configured to, in a third data-reading mode, obtain the first target image data according to the first color original image data generated by exposure of the color pixels in each subunit 102 for the first exposure duration, obtain the second target image data according to the second color original image data generated by exposure of the color pixels in each subunit 102 for the second exposure duration, obtain the third target image data according to the first color original image data generated by exposure of the color pixels in each subunit 102 for the first exposure duration and the first panchromatic original image data generated by exposure of the panchromatic pixels in each subunit 102 for the first exposure duration, and obtain the fourth target image data according to the second color original image data generated by exposure of the color pixels in each subunit 102 for the second exposure duration and the second panchromatic original image data generated by exposure of the panchromatic pixels in each subunit 102 for the second exposure duration.

Specifically, the first exposure duration may be longer than the second exposure duration, or the first exposure duration may be shorter than the second exposure duration. The third data-reading mode is suitable for high-dynamic-range (HDR) scenarios.

Referring to FIG. 29, in an example, the minimal repeating unit includes 4 subunits 102, and the minimal repeating unit includes 16 pixels 101. The 4 subunits 102 and the 16 pixels 101 in FIG. 29 are denoted similarly to the 4 subunits 102 and the 16 pixels 101 in FIG. 19, and will not be described in detail herein.

Color pixel R11, panchromatic pixel W12, color pixel G13, and panchromatic pixel W14 are exposed for the first exposure duration. Panchromatic pixel W21, the color pixel R22, the panchromatic pixel W23, and the color pixel G24 are exposed for the second exposure duration. Color pixel G31, panchromatic pixel W32, color pixel B33, and panchromatic pixel W34 are exposed for the first exposure duration. Panchromatic pixel W41, color pixel G42, panchromatic pixel W43, and color pixel B44 are exposed for the second exposure duration.

In the third data-reading mode, the processor obtains the first target image data according to the first color original image data generated by exposure of the color pixels in each subunit 102 for the first exposure duration, obtains the second target image data according to the second color original image data generated by exposure of the color pixels in each subunit 102 for the second exposure duration, obtains the third target image data according to the first color original image data generated by exposure of the color pixels in each subunit 102 for the first exposure duration and the first panchromatic original image data generated by exposure of the panchromatic pixels in each subunit 102 for the first exposure duration, and obtains the fourth target image data according to the second color original image data generated by exposure of the color pixels in each subunit 102 for the second exposure duration and the second panchromatic original image data generated by exposure of the panchromatic pixels in each subunit 102 for the second exposure duration. In the example of FIG. 29, the processor 20 may obtain the third target image data according to the first color original image data generated by exposure of the color pixels arranged horizontally in each subunit 102 for the first exposure duration and the first panchromatic original image data generated by exposure of the panchromatic pixels arranged horizontally in each subunit 102 for the first exposure duration, and obtains the fourth target image data according to the second color original image data generated by exposure of the color pixels arranged horizontally in each subunit 102 for the second exposure duration and the second panchromatic original image data generated by exposure of the panchromatic pixels arranged horizontally in each subunit 102 for the second exposure duration. In an example of another arrangement of pixels 101, the processor 20 may obtain the third target image data according to the first color original image data generated by exposure of the color pixels arranged vertically in each subunit 102 for the first exposure duration and the first panchromatic original image data generated by exposure of the panchromatic pixels arranged vertically in each subunit 102 for the first exposure duration, and obtains the fourth target image data according to the second color original image data generated by exposure of the color pixels arranged vertically in each subunit 102 for the second exposure duration and the second panchromatic original image data generated by exposure of the panchromatic pixels arranged vertically in each subunit 102 for the second exposure duration.

For example, when the 2D pixel array 11 includes two minimal repeating units and the two minimal repeating units are arranged horizontally, the target image data outputted by the processor 20 according to the original image data is: first target image data obtained according to the first color original image data of color pixel R11 exposed for the first exposure duration, third target image data obtained according to the first color original image data of color pixel R11 exposed for the first exposure duration and the first panchromatic original image data of panchromatic pixel W12 exposed for the first exposure duration, first target image data obtained according to the first color original image data of color pixel G13 exposed for the first exposure duration, third target image data obtained according to the first color original image data of color pixel G13 exposed for the first exposure duration and the first panchromatic original image data of panchromatic pixel W14 exposed for the first exposure duration . . . second target image data obtained according to the second color original image data of color pixel R22 exposed for the second exposure duration, fourth target image data obtained according to the second color original image data of color pixel R22 exposed for the second exposure duration and the second panchromatic original image data of the panchromatic pixel W21 exposed for the second exposure duration, second target image data obtained according to the second color original image data of color pixel G24 exposed for the second exposure duration, fourth target image data obtained according to the second color original image data of color pixel G24 exposed for the second exposure duration and the second panchromatic original image data of panchromatic pixel W23 exposed for the second exposure duration . . . first target image data obtained according to the first color original image data of color pixel G31 exposed for the first exposure duration, third target image data obtained according to the first color original image data of color pixel G31 exposed for the first exposure duration and the first panchromatic original image data of panchromatic pixel W32 exposed for the first exposure duration, first target image data obtained according to the first color original image data of color pixel B33 exposed for the first exposure duration, third target image data obtained according to the first color original image data of color pixel B33 exposed for the first exposure duration and the first panchromatic original image data of panchromatic pixel W34 exposed for the first exposure duration ... second target image data obtained according to the second color original image data of color pixel G42 exposed for the second exposure duration, fourth target image data obtained according to the second color original image data of color pixel G42 exposed for the second exposure duration and the second panchromatic original image data of panchromatic pixel W41 exposed for the second exposure duration, second target image data obtained according to the second color original image data of color pixel B44 exposed for the second exposure duration, fourth target image data obtained according to the second color original image data of color pixel B44 exposed for the second exposure duration and the second panchromatic original image data of panchromatic pixel W34 exposed for the second exposure duration . . . . In implementations of the disclosure, the first target image data, the third target image data, the second target image data, and the fourth target image data form data subunits, and one data subunit corresponds to one subunit 102. One column of target image data includes the first target image data obtained according to the first color original image data of the color pixel exposed for the first exposure duration and the second target image data obtained according to the second color original image data of the color pixel exposed for the second exposure duration. One column of target image data includes the third target image data obtained according to the first color original image data of the color pixel exposed for the first exposure duration and the first panchromatic original image data of the panchromatic pixel exposed for the first exposure duration and the fourth target image data obtained according to the second color original image data of the color pixel exposed for the second exposure duration and the second panchromatic original image data of the panchromatic pixel exposed for the second exposure duration. Since the panchromatic original image data of the panchromatic pixels exposed for the first exposure duration or the panchromatic pixels exposed for the second exposure duration is fused into the second target image data and the fourth target image data, the SNR of the image sensor 10 can be improved.

It should be noted that, since in the example illustrated in FIG. 29, the original image data obtained by the exposure of the 2D pixel array 11 completely corresponds to the pixels 101 in the 2D pixel array 11 in terms of arrangement, illustrations of the original image data are omitted in FIG. 29.

Referring to FIG. 17 and FIG. 30, in some implementations, the third target image data is obtained according to the first color original image data generated by exposure of the color pixels in each subunit 102 for the first exposure duration and the first panchromatic original image data generated by exposure of the panchromatic pixels in each subunit 102 for the first exposure duration as follows.

0231: The third target image data is obtained by performing pixel addition on the first color original image data generated by exposure of the color pixels in each subunit 102 for the first exposure duration and the first panchromatic original image data generated by exposure of the panchromatic pixels in each subunit 102 for the first exposure duration.

The fourth target image data is obtained according to the second color original image data generated by exposure of the color pixels in each subunit 102 for the second exposure duration and the second panchromatic original image data generated by exposure of the panchromatic pixels in each subunit 102 for the second exposure duration.

0232: The fourth target image data is obtained by performing pixel addition on the second color original image data generated by exposure of the color pixels in each subunit 102 for the second exposure duration and the second panchromatic original image data generated by exposure of the panchromatic pixels in each subunit 102 for the second exposure duration.

Referring to FIG. 17, in some implementations, operation 0231 and operation 0232 may be implemented by the processor 20. That is, the processor 20 may be configure to obtain the third target image data by performing pixel addition on the first color original image data generated by exposure of the color pixels in each subunit 102 for the first exposure duration and the first panchromatic original image data generated by exposure of the panchromatic pixels in each subunit 102 for the first exposure duration, and obtain the fourth target image data by performing pixel addition on the second color original image data generated by exposure of the color pixels in each subunit 102 for the second exposure duration and the second panchromatic original image data generated by exposure of the panchromatic pixels in each subunit 102 for the second exposure duration.

Specifically, still referring to FIG. 29, the first target image data may include the first target image data at the color pixel R corresponding to S, the first target image data at the color pixel G corresponding to S, and the first target image data at the color pixel B corresponding to S in the right image of FIG. 29. The second target image data may include the second target image data at the color pixel R corresponding to L, the second target image data at the color pixel G corresponding to L, and the second target image data at the color pixel B corresponding to L in the right image of FIG. 29. The third target image data may include the third target image data at the color pixel R corresponding to S', the third target image data at the color pixel G corresponding to S', and the third target image data at the color pixel B corresponding to S' in the right image of FIG. 29. The fourth target image data may include the fourth target image data at the color pixel R corresponding to L', the fourth target image data at the color pixel G corresponding to L', and the fourth target image data at the color pixel B corresponding to L' in the right image of FIG. 29.

For the first target image data and the second target image data, the processor 20 may directly read the first color original image data generated by exposure of the color pixels for the first exposure duration to output the first target image data, and directly read the second color original image data generated by exposure of the color pixels for the second exposure duration to output the second target image data.

For example, for subunit U1, the processor 20 directly reads the first color original image data of color pixel R11 exposed for the first exposure duration to output the first target image data, and directly reads the second color original image data of color pixel R22 exposed for the second exposure duration to output the second target image data. For subunit U2, the processor 20 directly reads the first color original image data of color pixel G13 exposed for the first exposure duration to output the first target image data, and directly reads the second color original image data of color pixel G24 exposed for the second exposure duration to output the second target image data. For subunit U3, the processor 20 directly reads the first color original image data of color pixel G31 exposed for the first exposure duration to output the first target image data, and directly reads the second color original image data of color pixel G42 exposed for the second exposure duration to output the second target image data. For subunit U4, the processor 20 directly reads the first color original image data of color pixel B33 exposed for the first exposure duration to output the first target image data, and directly reads the second color original image data of color pixel B44 exposed for the second exposure duration to output the second target image data.

In the implementations of the disclosure, for the third target image data and the fourth target image data, the processor 20 may perform pixel addition on the first color original image data generated by exposure of the color pixel for the first exposure duration and the first panchromatic original image data generated by exposure of the panchromatic pixel for the first exposure duration, to obtain the third target image data, and perform pixel addition on the second color original image data generated by exposure of the color pixel for the second exposure duration and the second panchromatic original image data generated by exposure of the panchromatic pixel for the second exposure duration, to obtain the fourth target image data.

For example, for subunit U1, the processor 20 performs pixel addition on the first color original image data of color pixel R11 exposed for the first exposure duration and the first panchromatic original image data of panchromatic pixel W12 exposed for the first exposure duration to obtain the third target image data, and performs pixel addition on the second color original image data of color pixel R22 exposed for the second exposure duration and the second panchromatic original image data of panchromatic pixel W21 exposed for the second exposure duration to obtain the fourth target image data.

For subunit U2, the processor 20 performs pixel addition on the first color original image data of color pixel G13 exposed for the first exposure duration and the first panchromatic original image data of panchromatic pixel W14 exposed for the first exposure duration to obtain the third target image data, and performs pixel addition on the second color original image data of color pixel G24 exposed for the second exposure duration and the second panchromatic original image data of panchromatic pixel W23 exposed for the second exposure duration to obtain the fourth target image data.

For subunit U3, the processor 20 performs pixel addition on the first color original image data of color pixel G31 exposed for the first exposure duration and the first panchromatic original image data of panchromatic pixel W32 exposed for the first exposure duration to obtain the third target image data, and performs pixel addition on the second color original image data of color pixel G42 exposed for the second exposure duration and the second panchromatic original image data of panchromatic pixel W41 exposed for the second exposure duration to obtain the fourth target image data.

For subunit U4, the processor 20 performs pixel addition on the first color original image data of color pixel B33 exposed for the first exposure duration and the first panchromatic original image data of panchromatic pixel W34 exposed for the first exposure duration to obtain the third target image data, and performs pixel addition on the second color original image data of color pixel B44 exposed for the second exposure duration and the second panchromatic original image data of panchromatic pixel W43 exposed for the second exposure duration to obtain the fourth target image data.

In some implementations, after the target image data is obtained through any of the above implementations, a corresponding algorithm may be further selected from the back-end algorithms for the camera assembly 40 according to the data output structure of the target image data, so as to process the target image data (the back-end algorithm can be compatible with the data output structure). The target image data processed using the algorithm can be matched with hardware such as the back-end image processor.

Referring to FIG. 31, a mobile terminal 90 according to implementations of the disclosure includes a housing 80 and the camera assembly 40 according to any of the above implementations. The camera assembly 40 is received in the housing 80. Specifically, the camera assembly 40 can be installed on the front of the housing 80 as a front camera assembly, or the camera assembly 40 can be installed on the back of the housing 80 as a rear camera assembly. The mobile terminal 90 may be a mobile phone, a tablet computer, a notebook computer, a smart wearable device (such as a smart watch, a smart bracelet, smart glasses, a smart helmet, etc.), a head-mounted display device, a virtual reality device, etc., which are not limited herein.

According to the mobile terminal 90 in implementations of the disclosure, multiple panchromatic pixels are added in the 2D pixel array 11. Compared with the general image sensor based on Bayer pixel arrangement or based on QuadBayer pixel arrangement, luminous flux can be increased, allowing a better SNR. According to the mobile terminal 90 in implementations of the disclosure, exposure of the 2D pixel array 11 is controlled to obtain the original image data, and the target image data is outputted according to the original image data, so that a data output structure of the outputted target image data can be matched with the back-end algorithms and hardware functions.

In the description of this specification, the terms "one implementation", "some implementations", "exemplary implementation", "example", "specific example", "some examples" and the like, mean that a particular feature, structure, material, or characteristic described in conjunction with the implementations is included in at least one implementation or example of the disclosure. In this specification, schematic representations of the above terms do not necessarily refer to the same implementation or example. Furthermore, the particular feature, structure, material or characteristic described may be combined in any suitable manner in any one or more implementations or examples. Furthermore, those skilled in the art may combine and merge different implementations or examples described in this specification, as well as the features of the different implementations or examples, without conflicting each other.

Any description of a process or method in the flowcharts or otherwise described herein may be understood to represent a module, segment or portion of code including one or more executable instructions for implementing a specified logical function or operation of the process, and the scope of the implementations of the disclosure includes alternative implementations in which the functions may be performed out of the order illustrated or discussed, including performing the functions substantially concurrently or in the reverse order depending upon the functions involved, which should be understood by those skilled in the art to which the implementations of the disclosure belong.

Although the implementations of the disclosure have been illustrated and described above, it should be understood that the above implementations are exemplary and should not be construed as limitations to the disclosure. Variations, modifications, substitutions, and alterations may be made to the above implementations by those skilled in the art within the scope of the disclosure.

What is claimed is:

1. A control method for an image sensor, the image sensor comprising a two-dimensional (2D) pixel array, the 2D pixel array comprising a plurality of minimal repeating units, each minimal repeating unit comprising a plurality of subunits, each subunit comprising a plurality of color pixels and a plurality of panchromatic pixels, the color pixels having a narrower spectral response than the panchromatic pixels, the control method comprising:
   obtaining original image data by controlling exposure of the 2D pixel array, the original image data comprising color original image data generated by exposure of the color pixels and panchromatic original image data generated by exposure of the panchromatic pixels; and
   outputting target image data according to the original image data;
   wherein obtaining the original image data by controlling exposure of the 2D pixel array comprises:
      obtaining first original image data by controlling a plurality of color pixels and a plurality of panchromatic pixels in a (2n−1)-th row to be exposed for a first exposure duration; and
      obtaining second original image data by controlling a plurality of color pixels and a plurality of panchromatic pixels in a 2n-th row to be exposed for a second exposure duration, wherein
      n is a natural number greater than or equal to 1, the first exposure duration is different from the second exposure duration, the first original image data comprises first color original image data generated by exposure of the color pixels and first panchromatic original image data generated by exposure of the panchromatic pixels, and the second original image data comprises second color original image data generated by exposure of the color pixels and second panchromatic original image data generated by exposure of the panchromatic pixels.

2. The method of claim 1, wherein outputting the target image data according to the original image data comprises:
   in a first data-reading mode, outputting the target image data by reading the original image data row-by-row.

3. The method of claim 1, wherein the target image data comprises first target image data and second target image data, and outputting the target image data according to the original image data comprises:
   in a second data-reading mode:
      obtaining the first target image data according to the color original image data;
      obtaining the second target image data according to the color original image data and the panchromatic original image data; and
      outputting the first target image data and the second target image data.

4. The method of claim 3, wherein
obtaining the first target image data according to the color original image data comprises:
   obtaining the first target image data by performing pixel addition on the color original image data per subunit; and
obtaining the second target image data according to the color original image data and the panchromatic original image data comprises:
   performing pixel addition on the color original image data per subunit, and performing pixel addition on the panchromatic original image data per subunit; and
   obtaining the second target image data by performing pixel averaging on the color original image data subjected to pixel addition and the panchromatic original image data subjected to pixel addition per subunit.

5. The method of claim 3, wherein
obtaining the first target image data according to the color original image data comprises:
   obtaining the first target image data by performing pixel averaging on the color original image data per subunit; and
obtaining the second target image data according to the color original image data and the panchromatic original image data comprises:
   obtaining the second target image data by performing pixel averaging on the color original image data and the panchromatic original image data per subunit.

6. The method of claim 3, wherein
obtaining the first target image data according to the color original image data comprises:
   obtaining the first target image data by performing pixel addition on the color original image data per subunit; and
obtaining the second target image data according to the color original image data and the panchromatic original image data comprises:
   obtaining the second target image data by performing pixel addition on the color original image data and the panchromatic original image data per subunit.

7. The method of claim 1, wherein the target image data comprises first target image data, second target image data, third target image data, and fourth target image data, and outputting the target image data according to the original image data comprises:
   in a third data-reading mode,
      obtaining the first target image data according to the first color original image data;
      obtaining the second target image data according to the second color original image data;
      obtaining the third target image data according to the first color original image data and the first panchromatic original image data;
      obtaining the fourth target image data according to the second color original image data and the second panchromatic original image data; and
      outputting the first target image data, the second target image data, the third target image data, and the fourth target image data.

8. The method of claim 7, wherein
obtaining the third target image data according to the first color original image data and the first panchromatic original image data comprises:
   obtaining the third target image data by performing pixel addition on the first color original image data and the first panchromatic original image data per subunit; and
obtaining the fourth target image data according to the second color original image data and the second panchromatic original image data comprises:

obtaining the fourth target image data by performing pixel addition on the second color original image data and the second panchromatic original image data per subunit.

9. A camera assembly, comprising:
an image sensor comprising a two-dimensional (2D) pixel array, the 2D pixel array comprising a plurality of minimal repeating units, each minimal repeating unit comprising a plurality of subunits, each subunit comprising a plurality of color pixels and a plurality of panchromatic pixels, the color pixels having a narrower spectral response than the panchromatic pixels; and
a processor configured to:
obtain original image data by controlling exposure of the 2D pixel array, the original image data comprising color original image data generated by exposure of the color pixels and panchromatic original image data generated by exposure of the panchromatic pixels; and
output target image data according to the original image data;
wherein the processor configured to obtain the original image data by controlling exposure of the 2D pixel array is configured to:
obtain first original image data by controlling a plurality of color pixels and a plurality of panchromatic pixels in a (2n−1)-th row to be exposed for a first exposure duration; and
obtain second original image data by controlling a plurality of color pixels and a plurality of panchromatic pixels in a 2n-th row to be exposed for a second exposure duration, wherein
n is a natural number greater than or equal to 1, the first exposure duration is different from the second exposure duration, the first original image data comprises first color original image data generated by exposure of the color pixels and first panchromatic original image data generated by exposure of the panchromatic pixels, and the second original image data comprises second color original image data generated by exposure of the color pixels and second panchromatic original image data generated by exposure of the panchromatic pixels.

10. The camera assembly of claim 9, wherein the processor configured to output the target image data according to the original image data is configured to:
in a first data-reading mode, output the target image data by reading the original image data row-by-row.

11. The camera assembly of claim 9, wherein the target image data comprises first target image data and second target image data, and the processor configured to output the target image data according to the original image data is configured to:
in a second data-reading mode:
obtain the first target image data according to the color original image data;
obtain the second target image data according to the color original image data and the panchromatic original image data; and
output the first target image data and the second target image data.

12. The camera assembly of claim 11, wherein
the processor configured to obtain the first target image data according to the color original image data is configured to:
obtain the first target image data by performing pixel addition on the color original image data per subunit; and
the processor configured to obtain the second target image data according to the color original image data and the panchromatic original image data is configured to:
perform pixel addition on the color original image data per subunit, and perform pixel addition on the panchromatic original image data per subunit; and
obtain the second target image data by performing pixel averaging on the color original image data subjected to pixel addition and the panchromatic original image data subjected to pixel addition per subunit.

13. The camera assembly of claim 11, wherein
the processor configured to obtain the first target image data according to the color original image data is configured to:
obtain the first target image data by performing pixel averaging on the color original image data per subunit; and
the processor configured to obtain the second target image data according to the color original image data and the panchromatic original image data is configured to:
obtain the second target image data by performing pixel averaging on the color original image data and the panchromatic original image data per subunit.

14. The camera assembly of claim 11, wherein
the processor configured to obtain the first target image data according to the color original image data is configured to:
obtain the first target image data by performing pixel addition on the color original image data per subunit; and
the processor configured to obtain the second target image data according to the color original image data and the panchromatic original image data is configured to:
obtain the second target image data by performing pixel addition on the color original image data and the panchromatic original image data per subunit.

15. The camera assembly of claim 9, wherein the target image data comprises first target image data, second target image data, third target image data, and fourth target image data, and the processor configured to output the target image data according to the original image data is configured to:
in a third data-reading mode,
obtain the first target image data according to the first color original image data;
obtain the second target image data according to the second color original image data;
obtain the third target image data according to the first color original image data and the first panchromatic original image data;
obtain the fourth target image data according to the second color original image data and the second panchromatic original image data; and
output the first target image data, the second target image data, the third target image data, and the fourth target image data.

16. The camera assembly of claim 15, wherein
the processor configured to obtain the third target image data according to the first color original image data and the first panchromatic original image data is configured to:
obtain the third target image data by performing pixel addition on the first color original image data and the first panchromatic original image data per subunit; and the processor configured to obtain the fourth target image data according to the second color original image data and the second panchromatic original image data is configured to:

obtain the fourth target image data by performing pixel addition on the second color original image data and the second panchromatic original image data per subunit.

17. A mobile terminal, comprising a housing and a camera assembly received in the housing, the camera assembly comprising:

an image sensor comprising a two-dimensional (2D) pixel array, the 2D pixel array comprising a plurality of minimal repeating units, each minimal repeating unit comprising a plurality of subunits, each subunit comprising a plurality of color pixels and a plurality of panchromatic pixels, the color pixels having a narrower spectral response than the panchromatic pixels; and a processor configured to:

obtain original image data by controlling exposure of the 2D pixel array, the original image data comprising color original image data generated by exposure of the color pixels and panchromatic original image data generated by exposure of the panchromatic pixels; and output target image data according to the original image data-;

wherein the processor configured to obtain the original image data by controlling exposure of the 2D pixel array is configured to:

obtain first original image data by controlling a plurality of color pixels and a plurality of panchromatic pixels in a (2n−1)-th row to be exposed for a first exposure duration; and obtain second original image data by controlling a plurality of color pixels and a plurality of panchromatic pixels in a 2n-th row to be exposed for a second exposure duration, wherein n is a natural number greater than or equal to 1, the first exposure duration is different from the second exposure duration, the first original image data comprises first color original image data generated by exposure of the color pixels and first panchromatic original image data generated by exposure of the panchromatic pixels, and the second original image data comprises second color original image data generated by exposure of the color pixels and second panchromatic original image data generated by exposure of the panchromatic pixels.

18. The mobile terminal of claim 17, wherein the processor configured to output the target image data according to the original image data is configured to:

in a first data-reading mode, output the target image data by reading the original image data row-by-row.

19. The mobile terminal of claim 17, wherein the target image data comprises first target image data and second target image data, and the processor configured to output the target image data according to the original image data is configured to:

in a second data-reading mode:

obtain the first target image data according to the color original image data;

obtain the second target image data according to the color original image data and the panchromatic original image data; and output the first target image data and the second target image data.

20. The mobile terminal of claim 17, wherein the target image data comprises first target image data, second target image data, third target image data, and fourth target image data, and the processor configured to output the target image data according to the original image data is configured to:

in a third data-reading mode:

obtain the first target image data according to the first color original image data;

obtain the second target image data according to the second color original image data;

obtain the third target image data according to the first color original image data and the first panchromatic original image data;

obtain the fourth target image data according to the second color original image data and the second panchromatic original image data; and output the first target image data, the second target image data, the third target image data, and the fourth target image data.

* * * * *